(12) United States Patent
Ban

(10) Patent No.: US 8,306,521 B2
(45) Date of Patent: Nov. 6, 2012

(54) VEHICLE CONTROL APPARATUS WITH DATA REPROGRAMMABLE VIA WIRELESS COMMUNICATION NETWORK

(75) Inventor: Yoshinori Ban, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1220 days.

(21) Appl. No.: 12/149,588

(22) Filed: May 5, 2008

(65) Prior Publication Data

US 2008/0280602 A1 Nov. 13, 2008

(30) Foreign Application Priority Data

May 7, 2007 (JP) ................................ 2007-122054

(51) Int. Cl.
*H04M 3/00* (2006.01)
(52) U.S. Cl. .................... 455/419; 455/418; 455/420
(58) Field of Classification Search ........... 455/418–420
See application file for complete search history.

(56) References Cited

U.S. PATENT DOCUMENTS

| | | | |
|---|---|---|---|
| 5,803,043 A | 9/1998 | Bayron et al. | |
| 7,068,147 B2 | 6/2006 | Suganuma et al. | |
| 2003/0058083 A1* | 3/2003 | Birchfield | 340/5.22 |
| 2006/0220900 A1* | 10/2006 | Ceskutti et al. | 340/825.22 |
| 2006/0293813 A1* | 12/2006 | Nou | 701/33 |
| 2007/0005204 A1 | 1/2007 | Yamamoto et al. | |

FOREIGN PATENT DOCUMENTS

| | | |
|---|---|---|
| EP | 1 109 085 | 6/2001 |
| JP | H05-195859 | 8/1993 |
| JP | 07-162480 | 6/1995 |
| JP | 2001-225706 | 8/2001 |
| JP | 2001-285962 | 10/2001 |
| JP | 2003-307422 | 10/2003 |
| JP | 2004-192278 | 7/2004 |
| JP | 2005-189997 | 7/2005 |
| JP | 2005-202503 | 7/2005 |
| JP | 2006-146583 | 6/2006 |
| JP | 2007-011734 | 1/2007 |
| WO | WO 2007/024367 | 3/2007 |

OTHER PUBLICATIONS

Japanese Office Action dated May 19, 2009, issued in corresponding Japanese Application No. 2007-122054, with English translation.
European Office Action dated Mar. 23, 2011, issued in corresponding European Application No. 08 008 444.5-2212.
Extended European Search Report dated Apr. 6, 2010, issued in corresponding European Application No. 08008444.5-2212.
Phoha et al "Control Issues in Network Security", Annual Review of Communications, National Engineering Consortium, Jan. 1996, pp. 617-622.

* cited by examiner

*Primary Examiner* — Olumide T Ajibade Akonai
*Assistant Examiner* — Jaime Holliday
(74) *Attorney, Agent, or Firm* — Nixon & Vanderhye PC

(57) ABSTRACT

In a vehicle control apparatus for reprogramming data stored therein based on a reprogramming instruction transmitted thereto via a wireless communication network, an asking unit is provided. The asking unit asks a data reprogramming unit about whether the reprogramming instruction is validated or not. The data reprogramming unit has been authorized to reprogram the data stored in the vehicle control apparatus. A determining unit is provided in the vehicle control apparatus. The determining unit receives a reply to the asking transmitted from the data reprogramming unit via the wireless communication network and determines whether to enable or disable the reprogramming of the data stored in the vehicle control apparatus based on the received reply.

29 Claims, 14 Drawing Sheets

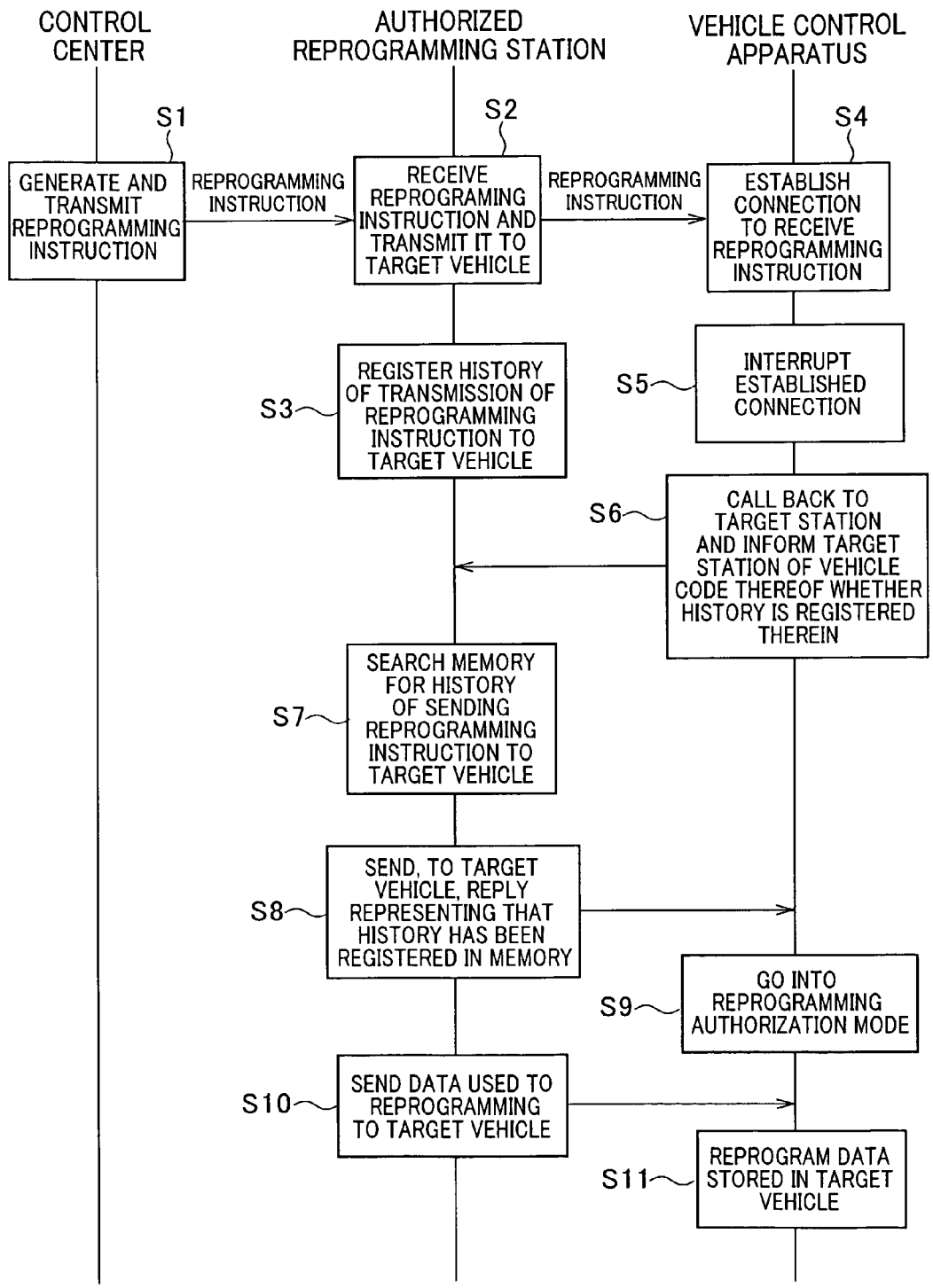

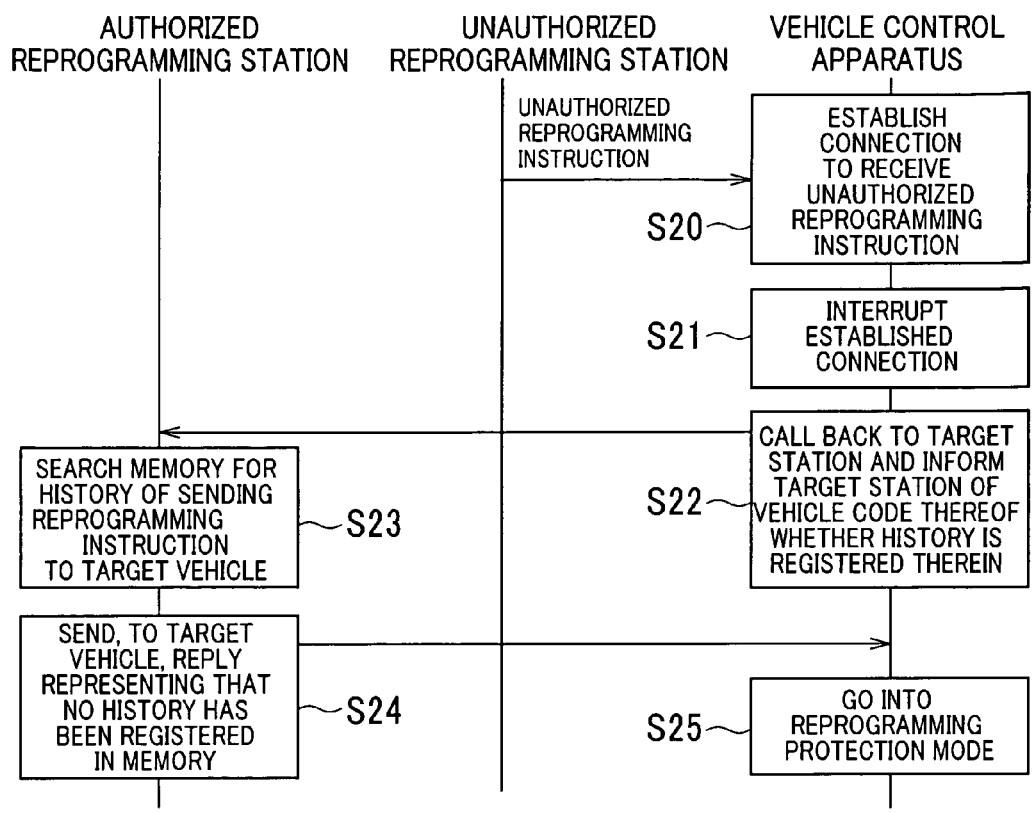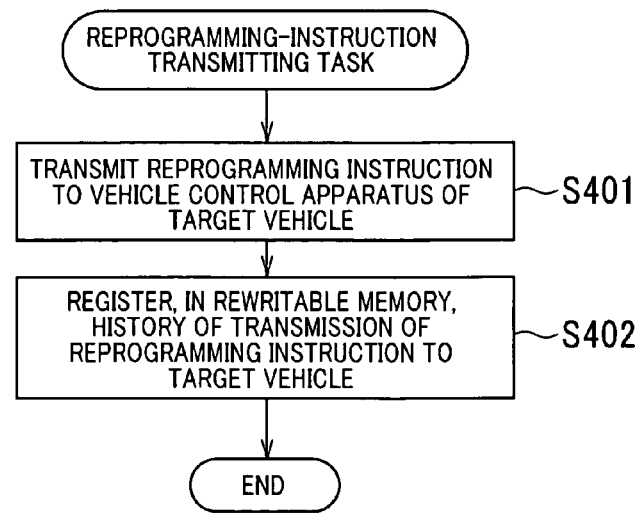

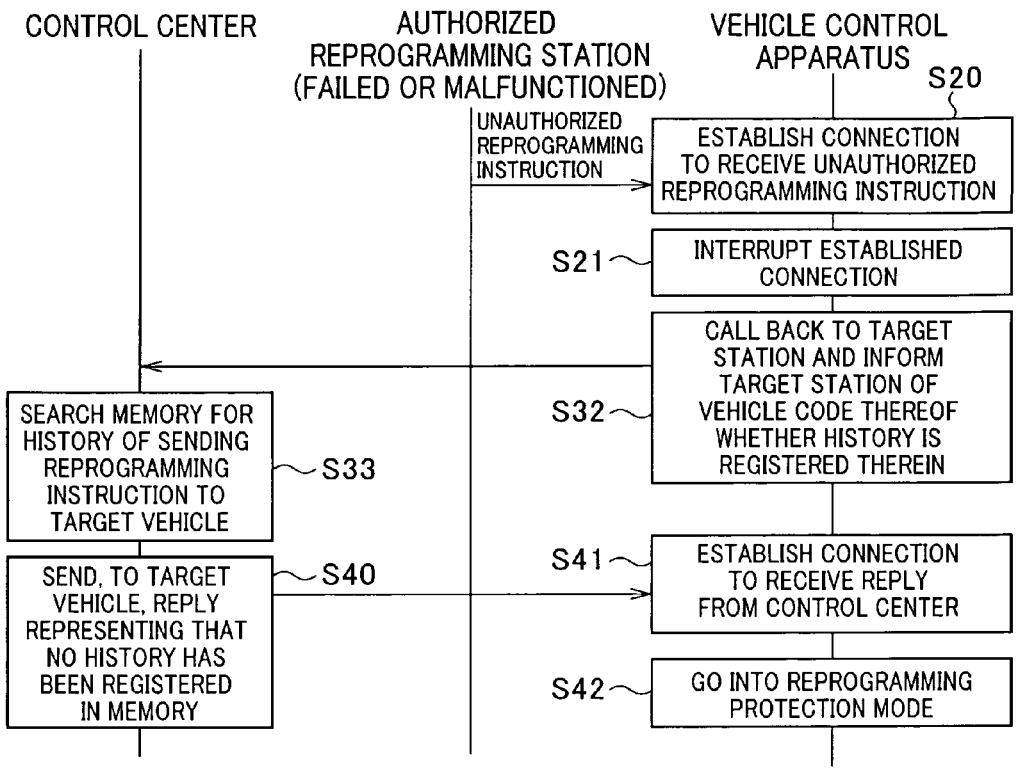
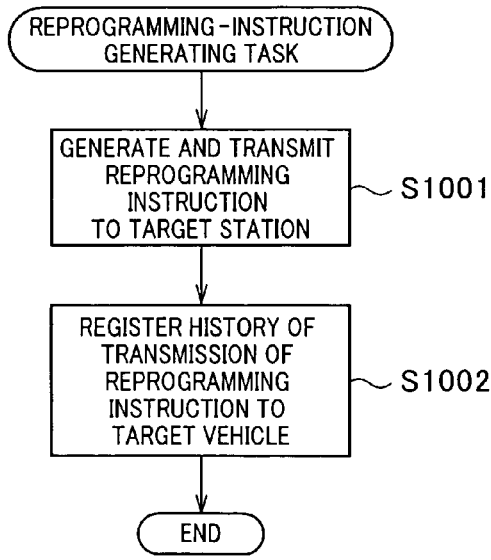

VEHICLE CONTROL APPARATUS WITH DATA REPROGRAMMABLE VIA WIRELESS COMMUNICATION NETWORK

CROSS REFERENCE TO RELATED APPLICATIONS

This application is based on Japanese Patent Application 2007-122054 filed on May 7, 2007. This application claims the benefit of priority from the Japanese Patent Application, so that the descriptions of which are all incorporated herein by reference.

FIELD OF THE INVENTION

The present invention relates to vehicle control apparatuses with data reprogrammable through a wireless communication network.

BACKGROUND OF THE INVENTION

A plurality of electronic control units (ECUs) are normally installed in a motor vehicle. Such ECUs are operative to control at least one target device/function installed in the motor vehicle in accordance with corresponding control programs and control data stored therein.

Specifically, each of the ECUs is programmed to execute the control programs using the control data, thereby controlling the corresponding at least one target device/function.

Such control programs stored in an ECU may be required to be reprogrammed with new versions thereof due to, for instance, software bugs in the control programs. Similarly, control data associated with the control programs and stored in an ECU may be required to be reprogrammed with new control data due to, for example, errors in the control data.

A remote reprogramming technology has been used for such data reprogramming. An example of the conventional remote reprogramming technology is disclosed in Japanese Patent Application Publication No. H05-195859.

The remote reprogramming technology is designed to remotely reprogram control programs and control data associated therewith stored in an ECU through a radio communication network, such as cellular networks.

The remote reprogramming technique prevents the drivers (users) from driving their motor vehicles for data reprogramming, making it possible to rapidly repair the bugs and/or errors in the control programs and/or the control data.

Specifically, in the remote reprogramming technique, a data reprogramming unit of a reprogramming station is provided and managed by a manufacture of motor vehicles which are integrated with an ECU.

In response to a request for data reprogramming of an ECU (target ECU) of one motor vehicle (target motor vehicle), the data reprogramming unit accesses the target ECU through cellular networks so as to inform the target ECU of a reprogramming instruction. Next, the data reprogramming unit sends, to the target ECU through the cellular networks, data for use in reprogramming. This data for use in reprogramming will be referred to as "reprogramming data" hereinafter.

On the other hand, the target ECU of each of the motor vehicles receives the reprogramming instruction sent from the reprogramming station, and provides for the receipt of the reprogramming data. When the reprogramming data is sent thereto from the data reprogramming unit, the target ECU of the target motor vehicle receives the reprogramming data. Thereafter, the target ECU reprograms at least one of control programs and control data associated therewith based on the received reprogramming data; these control programs and control data having been stored in the target ECU.

BRIEF SUMMARY OF THE INVENTION

In the remote reprogramming technique, if the data reprogramming unit installed in the reprogramming station abnormally operates, an abnormal rewriting instruction may be sent, through the radio communication network, to a target ECU of a motor vehicle to be reprogrammed.

In this case, the abnormal rewriting instruction may reprogram the control programs and control data stored in the target ECU; this may affect the operating conditions of the motor vehicle.

In view of the background, an object of at least one aspect of the present invention is to provide vehicle control apparatuses and data reprogramming systems, which are capable of inhibiting reprogramming in response to an unauthorized reprogramming instruction being sent through a wireless communication network.

According to one aspect of the present invention, there is provided a vehicle control apparatus for reprogramming data stored therein based on a reprogramming instruction transmitted thereto via a wireless communication network. The vehicle control apparatus includes an asking unit configured to ask a data reprogramming unit about whether the reprogramming instruction is validated or not. The data reprogramming unit has been authorized to reprogram the data stored in the vehicle control apparatus. The vehicle control apparatus includes a determining unit configured to receive a reply to the asking transmitted from the data reprogramming unit via the wireless communication network and to determine whether to enable or disable the reprogramming of the data stored in the vehicle control apparatus based on the received reply.

According to another aspect of the present invention, there is provided a vehicle control apparatus for reprogramming data stored therein based on a reprogramming instruction transmitted thereto via a wireless communication network. The vehicle control apparatus includes a receiving unit configured to receive a reprogramming disable instruction transmitted via an alternative wireless communication network except for the wireless communication network. The vehicle control apparatus includes a disabling unit configured to disable, according to the reprogramming disabling instruction, any one of:
  reprogramming of the data stored in the vehicle control apparatus; and
  receipt of an alternative reprogramming instruction transmitted via the wireless communication network.

According to a further aspect of the present invention, there is provided a data reprogramming system for reprogramming data stored in a vehicle control apparatus based on a reprogramming instruction transmitted thereto via a wireless communication network. The data reprogramming system includes a data reprogramming unit that has been authorized to reprogram the data stored in the vehicle control apparatus. The data reprogramming system includes an asking unit installed in the vehicle control apparatus and configured to ask the data reprogramming unit about whether the reprogramming instruction is validated or not. The data reprogramming system includes a determining unit installed in the vehicle control apparatus and configured to receive a reply to the asking transmitted from the data reprogramming unit via the wireless communication network and to determine whether to enable or disable the reprogramming of the data stored in the vehicle control apparatus based on the received reply.

According to a still further aspect of the present invention, there is provided a data reprogramming system for reprogramming data stored in a vehicle control apparatus based on a reprogramming instruction transmitted thereto via a wireless communication network. The data reprogramming system includes a data reprogramming unit that has been authorized to reprogram the data stored in the vehicle control apparatus. The data reprogramming system includes a receiving unit installed in the vehicle control apparatus and configured to receive a reprogramming disable instruction transmitted from the data reprogramming unit via an alternative wireless communication network except for the wireless communication network. The reprogramming disabling instruction represents disabling of any one of:

reprogramming of the data stored in the vehicle control apparatus; and receipt of an alternative reprogramming instruction transmitted via the wireless communication network.

In the one and further aspects of the present invention, the asking unit works to ask the data reprogramming unit about whether the reprogramming instruction is validated or not. The determining unit is configured to receive a reply to the asking transmitted from the data reprogramming unit via the wireless communication network and to determine whether to enable or disable the reprogramming of the data stored in the vehicle control apparatus based on the received reply.

Specifically, when the replay represents that the reprogramming instruction is validated, the determining unit enables the reprogramming of the data stored in the vehicle control apparatus.

In contrast, when the reply represents that the reprogramming instruction is not validated, the determining unit disables the reprogramming of the data stored in the vehicle control apparatus.

In another and the still further aspects of the present invention, the receiving unit works to receive a reprogramming disable instruction transmitted from the data reprogramming unit via an alternative wireless communication network except for the wireless communication network.

Specifically, in another and the still further aspects of the present invention, even if a failure occurs in the wireless communication network, it is possible to disable, according to the received reprogramming disabling instruction, any one of:

reprogramming of the data stored in the vehicle control apparatus; and receipt of an alternative reprogramming instruction transmitted via the wireless communication network.

BRIEF DESCRIPTION OF THE DRAWINGS

Other objects and aspects of the invention will become apparent from the following description of embodiments with reference to the accompanying drawings in which:

FIG. 2 is a sequence diagram schematically illustrating a routine to be executed by the data reprogramming system to thereby enable data reprogramming based on a reprogramming instruction sent from one of authorized reprogramming stations illustrated in FIG. 1;

FIG. 3 is a sequence diagram schematically illustrating a routine to be executed by the data reprogramming system to thereby disable the data reprogramming based on a reprogramming instruction sent from an unauthorized reprogramming station illustrated in FIG. 1;

FIG. 4 is a flowchart schematically illustrating a reprogramming-instruction transmitting task to be executed by a target station illustrated in FIG. 1;

FIG. 9 is a sequence diagram schematically illustrating a routine to be executed by the data reprogramming system when one failed or malfunctioned reprogramming station erroneously transmits a reprogramming instruction independently of the generation of a reprogramming instruction by a control center according to the second embodiment;

FIG. 10 is a flowchart schematically illustrating a reprogramming-instruction generating task to be executed by the control center according to the second embodiment;

DETAILED DESCRIPTION OF EMBODIMENTS OF THE INVENTION

Embodiments of the present invention will be described hereinafter with reference to the accompanying drawings.

First Embodiment

In a first embodiment of the present invention, a vehicle control apparatus 20 is designed to, when receiving an instruction to reprogram data stored therein, ask, to a data reprogramming unit, whether the received reprogramming instruction is validated; this data reprogramming unit has been authorized to reprogram data stored in the vehicle control system 20.

Such an instruction to reprogram data stored in the vehicle control apparatus 20 will also be referred to as "reprogramming instruction" hereinafter. In addition, reprogramming of data stored in the vehicle control apparatus 20 will be referred to as "data reprogramming" hereinafter. The data stored in the vehicle control apparatus 20 includes at least one control program required to control at least one target device/function and control data associated with the at least one control program.

The vehicle control apparatus 20 is also designed to enable the data reprogramming based on the received reprogramming instruction when a reply sent from the authorized data reprogramming unit represents that the received reprogramming instruction is validated.

The vehicle control apparatus 20 is further designed to disable the data reprogramming based on the received reprogramming instruction when the reply sent from the authorized data reprogramming system represents that the received reprogramming instruction is not validated.

The configuration of the vehicle control system 20 prevents invalid data-reprogramming based on unauthorized reprogramming instructions.

In the first embodiment, data stored in the vehicle control system 20 includes at least one control program for controlling at least one target device installed in the motor vehicle and control data associated with the at least one control program.

Figure 1:
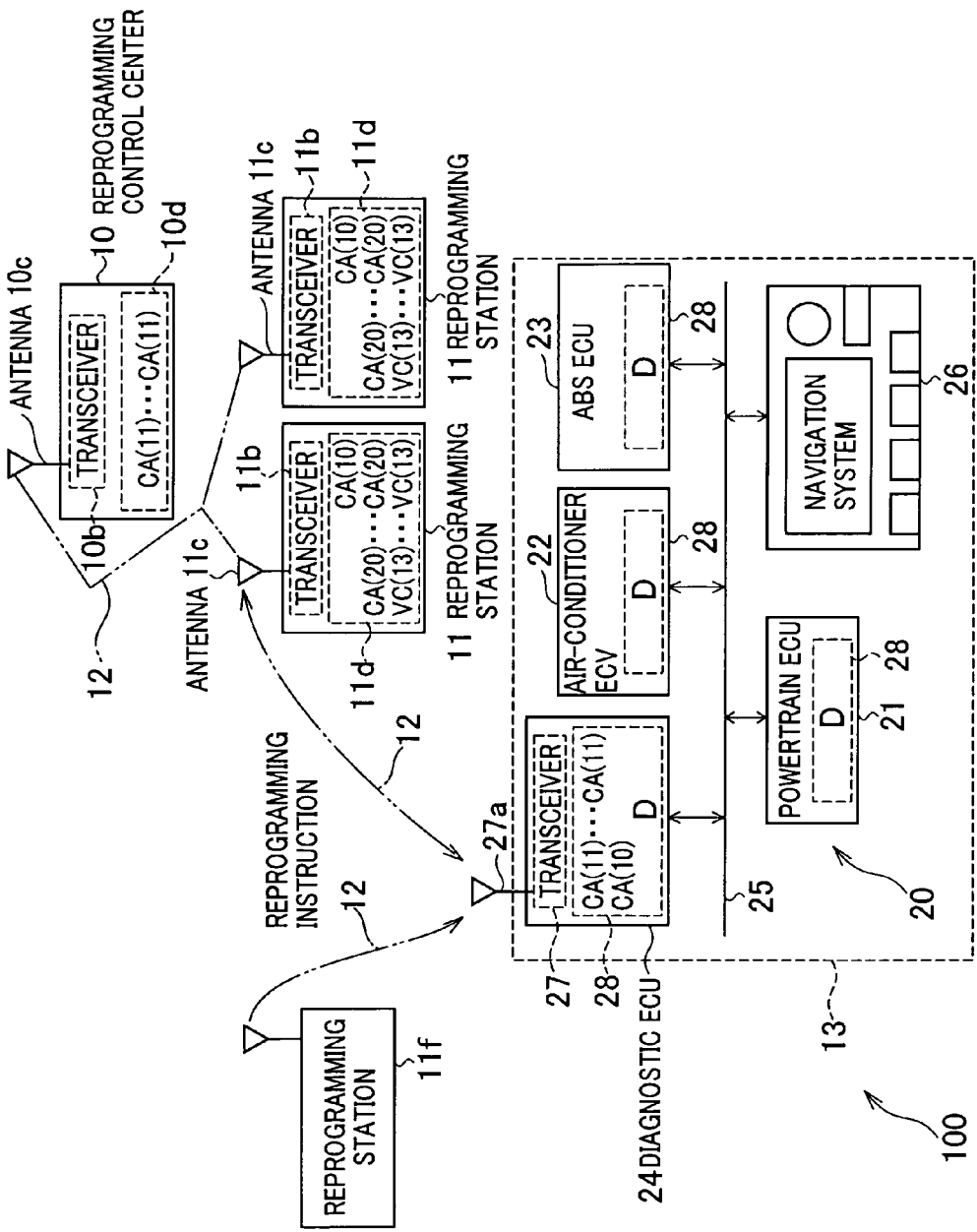
FIG. 1 is a block diagram schematically illustrating an example of the configuration of a data reprogramming system according to a first embodiment of the present invention.

Referring to FIG. 1, a data reprogramming system 100 according to the first embodiment is equipped with a reprogramming control center 10, a plurality of reprogramming stations 11 under the control of the reprogramming control center 10, and the vehicle control apparatus 20. The combinations of the respective reprogramming stations 11 and the reprogramming control center 10 will be referred to as "data reprogramming units 102" hereinafter. The data reprogramming units 102 share the reprogramming control center 10.

The reprogramming control center 10 is provided in, for example, a predetermined geographic area of a country. The geographic area is divided into a plurality of regions. For instance, at least one of the plurality of reprogramming stations 11 is provided in each of the plurality of regions such that each of the plurality of reprogramming stations 11 has a communication range equivalent to a corresponding one of the regions.

Each of the reprogramming stations 11, in other words, each of the data reprogramming units 102, has been authorized to reprogram data stored in a plurality of motor vehicles 13.

The vehicle control apparatus 20 has been installed in each of the motor vehicles 13. In the vehicle control apparatus 20, programs for control the corresponding motor vehicle 13 and control data associated therewith haven been stored.

For example, the reprogramming control center 10, referred to simply as "control center 10" is designed as a computer-based system.

Specifically, the control center 10 includes a transceiver 10b with an antenna 10c and a rewritable memory 10d.

The control center 10 has stored in the rewritable memory 10d a communication address CA(11) of each of the reprogramming stations 11 in, for example, file format. The communication address CA(11) of each of the reprogramming stations 11 identifies the location thereof in the cellular phone lines 12 as an example of wireless communication networks.

The transceiver 10b is operative to:
establish a connection through the cellular phone lines 12 between the control center 10 and either at least one reprogramming station 11 or the vehicle control apparatus 20 of at least one motor vehicle 13; and
interrupt the established connection.

Similarly, each of the reprogramming stations 11 is designed as a computer-based system.

Each of the reprogramming stations 11 includes a transceiver 11b with an antenna 11c and a rewritable memory 11d.

Similarly, each of the reprogramming stations 11 has stored in the rewritable memory 11d a communication address CA(10) of the reprogramming control center 10. The communication address CA(10) of the reprogramming control center 10 identifies the location thereof in the cellular phone lines 12.

Each of the reprogramming stations 11 also has stored in the rewritable memory 11d a vehicle code VC(13) of each of the authorized motor vehicles 13 and a communication address CA(20) of the vehicle control apparatus 20 of each of the motor vehicles 13. The communication address CA(20) of the vehicle control apparatus 20 of each of the motor vehicles 13 identifies the location thereof in the cellular phone lines 12.

The transceiver 11b is operative to:
establish a connection through the cellular phone lines 12 between the corresponding reprogramming station 11 and either the reprogramming control center 10 or the vehicle control apparatus 20 of at least one motor vehicle 13; and
interrupt the established connection.

The vehicle control apparatus 20 of each of the motor vehicles 13 includes a powertrain ECU 21, an air-conditioner ECU 22, an antilock braking (ABS) ECU 23, a diagnostic ECU 24, a in-vehicle network 25, and a navigation system 26. Each of the ECUs 21 to 24 is designed as a computer-based system with a rewritable memory 28.

In the rewritable memory 28 of each of the ECUs 21 to 24, a control program required to control corresponding at least one target device/function and control data associated with the control program have been stored. The control program and the control data stored in the rewritable memory 28 of each of the ECUs 21 to 24 is illustrated in FIG. 1 as "data D".

Specifically, the powertrain ECU 21 is operative to control, as its target devices/functions, an internal combustion engine and a power transmission system of the corresponding motor vehicle 13 in accordance with the control program and the control data stored therein.

The air conditioner ECU 22 is operative to control, as its target devices/functions, an air conditioner installed in the corresponding motor vehicle 13 in accordance with the control program and the control data stored therein.

The antilock braking ECU 23 is operative to control, as its target devices/functions, an antilock braking system installed in the corresponding motor vehicle 13 in accordance with the control program and the control data stored therein.

The diagnostic ECU 24 is operative to control, as its target devices/functions, a self-diagnostic function to diagnose each of the other ECUs 21 to 23 as slave ECUs and to diagnose itself in accordance with the control program and the control data stored therein.

Each of the ECUs 21 to 24 can communicate with another one of the ECUs 21 to 24 through the in-vehicle network 25 so as to transmit or receive information required for each of the ECUs 21 to 24 to control the corresponding target devices/functions.

The navigation system 26 consists of, for example, a memory and a display device, and electric map image data has been stored in the memory.

The navigation system 26 is operative to:
calculate the current exact location of the corresponding motor vehicle 13 based on radio signals transmitted from global positioning systems (GPS) and the electronic map image data stored in the memory;
display the current vehicle's exact location on the screen of the display device together with the readout electronic map image data associated with the vehicle's exact location;
calculate the best route to occupant's destination from the current location according to occupant's instructions; and
give an occupant(s) voice or visual guidance to the destination along the calculated best route using the display device and/or a speaker.

In the first embodiment, for example, in the diagnostic ECU 24, a transceiver 27 with an antenna 27a has been installed.

The diagnostic ECU 24 has stored in the memory 28 the communication address CA(10) of the reprogramming control center CA(10) and the communication address CA(11) of each of the authorized reprogramming stations 11 in, for example, file format.

The transceiver 27 is operative to:
establish a connection through the cellular phone lines 12 between the diagnostic ECU 24 and either the reprogramming control center 10 or at least one reprogramming station 11; and
interrupt the established connection.

Specifically, in the first embodiment, the diagnostic ECU 24 of the vehicle control apparatus 20 serves as a data reprogramming module for reprogramming the control program and the control data stored in at least one of the ECUs 21 to 24.

The data reprogramming system 100 according to the first embodiment is designed to assume that a reprogramming instruction is transmitted from a reprogramming station that has been unauthorized to reprogram data stored in each of the motor vehicles 13.

In the first embodiment, the reprogramming stations 11 that have been authorized to reprogram data stored in each of the motor vehicles 13 will be referred to as "authorized reprogramming stations" hereinafter. In addition, a reprogramming station that has been unauthorized to reprogram data stored in each of the motor vehicles 13 will be referred to as "unauthorized reprogramming station" hereinafter. To the unauthorized reprogramming station, a reference character 11f is assigned.

Under the assumption, the data reprogramming system 100 is configured to disable data reprogramming based on the reprogramming instruction sent from the unauthorized reprogramming station 11f.

FIG. 2 schematically illustrates a routine to be executed by the data reprogramming system 100 to thereby enable the data reprogramming based on the reprogramming instruction sent from one of the authorized reprogramming stations 11.

At a given timing, when wanting to reprogram the control data and the control program stored in at least one of the ECUs 21 to 24 of the vehicle control apparatus 20 of one of the motor vehicles 13, the control center 10 generates a reprogramming instruction. The reprogramming instruction is to reprogram the control program and the control data stored in the at least one of the ECUs 21 to 24 of the vehicle control apparatus 20 of the one of the motor vehicles 13. Hereinafter, the at least one of the ECUs 21 to 24 will be referred to as "target ECU", and the one of the motor vehicles 13 will be referred to as "target vehicle".

Next, the control center 10 transmits, from the antenna 10c to the communication address CA(11) of one of the authorized reprogramming stations 11, the reprogramming instruction as, for example, modulated carrier waves via cellular phone lines 12 in step S1. The one of the authorized reprogramming stations 11 is selected such that:
the location of the garage for the target vehicle 13 belongs to one of the regions corresponding to the one of the authorized reprogramming stations 11; or
the current location of the target vehicle 13 detected by the navigation system 26 belongs to one of the regions corresponding to the one of the authorized reprogramming stations 11. Hereinafter, the one of the authorized reprogramming stations 11 will be referred to as "target station".

The target station 11 receives, via the antenna 11c, the reprogramming instruction transmitted from the control center 10. The target station 11 transmits, from the antenna 11c to the communication address CA(20) of the vehicle control apparatus 20 of the target vehicle 13, the reprogramming instruction as modulated carrier waves via cellular phone lines 12 in step S2.

Simultaneously or thereafter, the target station 11 registers, in the rewritable memory 11d, a history of the transmission of reprogramming instructions to the target vehicle 13 in step S3. For example, the history is stored in the rewritable memory 11d to be associated with the vehicle code VC(13) of the target vehicle 13.

When the reprogramming instruction is transmitted from the target station 11, the diagnostic ECU 24 of the vehicle control apparatus 20 of the target vehicle 13 establishes a connection through the cellular phone lines 12 between the target station 11 and the corresponding vehicle control apparatus 20 to thereby receive, via the antenna 27a, the reprogramming instruction in step S4.

Next, the diagnostic ECU 24 interrupts the established connection in step S5.

Thereafter, the diagnostic ECU 24 searches the rewritable memory 28 for the communication address CA(11) of the one of the authorized reprogramming stations 11 (the target station 11). Then, the diagnostic ECU 24 calls back to the searched communication address CA(11) of the target station 11 in step S6. In other words, the diagnostic ECU 24 reestablishes a connection through the cellular phone lines 12 between the corresponding vehicle control apparatus 20 and the target station 11 based on the searched communication address CA(11) in step S6.

In step S6, the diagnostic ECU 24 informs the target station 11 of the vehicle code VC(13) of the corresponding target vehicle 13 to thereby ask the target station 11 about whether the history of the transmission of reprogramming instructions to the target vehicle 13 is registered in the target station 11.

When receiving the query including the vehicle code VC(13) of the target vehicle 13, the target station 11 searches the rewritable memory 11d for the history of the transmission of reprogramming instructions to the target vehicle 13 based on the vehicle code VC(13) of the target vehicle 13 in step S7.

At that time, the history of the transmission of reprogramming instructions to the target vehicle 13 has been registered in the rewritable memory 11d (see step S3). For this reason, the target station 11 transmits, to the vehicle control apparatus 20 of the target vehicle 13, a reply representing that the history of the transmission of reprogramming instructions to the target vehicle 13 has been registered in the rewritable memory 11d in step S8.

When receiving the reply representing that the history of the transmission of reprogramming instructions to the target vehicle 13 has been registered in the target station 11, the diagnostic ECU 24 determines that the received reprogramming instruction is validated. Then, the diagnostic ECU 24 goes into reprogramming authorization mode in step S9.

In the reprogramming authorization mode, the diagnostic ECU 24 enables reprogramming of the control program and the control data stored in the target ECU.

Specifically, the diagnostic ECU 24 reprograms at least part of the control program and/or the control data based on the received reprogramming instruction and on data used to the data reprogramming and sent from the target station 11 after the transmission of the reprogramming instruction in steps S10 and S11. The data used to the data reprogramming will be referred to as "reprogramming data" hereinafter.

In contrast, FIG. 3 schematically illustrates a routine to be executed by the data reprogramming system 100 to thereby disable the data reprogramming based on a reprogramming instruction sent from the unauthorized reprogramming station 11f.

When an unauthorized reprogramming instruction is transmitted from the unauthorized reprogramming station 11f, the diagnostic ECU 24 of the vehicle control apparatus 20 of the target vehicle 13 establishes a connection through the cellular phone lines 12 between the unauthorized reprogramming station 11f and the corresponding vehicle control apparatus 20. This allows receipt, via the antenna 27a, of the unauthorized reprogramming instruction in step S20.

Next, the diagnostic ECU 24 interrupts the established connection in step S21.

Thereafter, the diagnostic ECU 24 searches the rewritable memory 28 for the communication address CA(11) of one of the authorized reprogramming stations 11 independently of the source of the unauthorized reprogramming instruction. Specifically, the one of the authorized reprogramming stations 11 is selected such that:

the location of the garage for the target vehicle 13 belongs to one of the regions corresponding to the one of the authorized reprogramming stations 11; or the current location of the target vehicle 13 detected by the navigation system 26 belongs to one of the regions corresponding to the one of the authorized reprogramming stations 11. As described above, the one of the authorized reprogramming stations 11 corresponds to the target station 11.

Then, the diagnostic ECU 24 calls back to the searched communication address CA(11) of the target station 11 in step S22. In other words, the diagnostic ECU 24 reestablishes a connection through the cellular phone lines 12 between the corresponding vehicle control apparatus 20 and the target station 11 based on the searched communication address CA(11) in step S22.

In step S22, the diagnostic ECU 24 informs the target station 11 of the vehicle code VC(13) of the corresponding target vehicle 13 to thereby ask the target station 11 about whether a history of the transmission of reprogramming instructions to the target vehicle 13 is registered in the target station 11.

When receiving the vehicle code VC(13) of the target vehicle 13, the target station 11 searches the rewritable memory 11d for the history of the transmission of reprogramming instructions to the target vehicle 13 based on the vehicle code VC(13) of the target vehicle 13 in step S23.

At that time, no history of the transmission of reprogramming instructions to the target vehicle 13 has been registered in the rewritable memory 11d. For this reason, the target station 11 transmits, to the vehicle control apparatus 20 of the target vehicle 13, a reply representing that no history of the transmission of reprogramming instructions to the target vehicle 13 has been registered in the rewritable memory 11d in step S24.

When receiving the reply representing that no history of the transmission of reprogramming instructions to the target vehicle 13 has been registered in the target station 11, the diagnostic ECU 24 determines that the received reprogramming instruction is invalid, the diagnostic ECU 24 goes into reprogramming protection mode in step S25.

In the reprogramming protection mode, the diagnostic ECU 24 disables reprogramming of the control program and the control data stored in the target ECU even if data used to the reprogramming is sent from the unauthorized target station 11f after the transmission of the unauthorized reprogramming instruction.

In the descriptions set forth above, one of the motor vehicles 13 is set as the target vehicle 13, but each of the motor vehicles 13 can be set as the target vehicle 13.

As described above, when receiving a reprogramming instruction, the vehicle control apparatus 20 of each of the motor vehicles 13 is configured to ask one of the authorized reprogramming stations 11 about whether the received reprogramming instruction is validated.

The vehicle control apparatus 20 of each of the motor vehicles 13 is configured to enable data reprogramming based on the received reprogramming instruction only when a reply sent from the destination authorized reprogramming unit represents that the received reprogramming instruction is validated.

In other words, the vehicle control apparatus 20 of each of the motor vehicles 13 is configured to disable the data reprogramming based on the received reprogramming instruction when a reply sent from the destination authorized reprogramming unit represents that the received reprogramming instruction is invalid.

This prevents invalid data-reprogramming based on unauthorized reprogramming instructions when they are transmitted to the vehicle control apparatus 20 of each of the motor vehicles 13.

Note that, in a state that the unauthorized reprogramming instruction has been transmitted to the vehicle control apparatus 20 via the cellular phone lines 12, in other words, the data reprogramming system 100 has not been working properly, the transmission of the unauthorized reprogramming instruction can be repeated. For this reason, it is preferable that the remote reprogramming via the cellular phone lines 12 be held until the data reprogramming system 100 returns to proper operating conditions.

In this circumstance, after going into the reprogramming protection mode, the vehicle control apparatus 20 continuously operates in the reprogramming protection mode while disabling receipt of the reprogramming instructions.

For this reason, even if a new reprogramming instruction is sent to the vehicle control apparatus 20 after transition of its operation mode to the reprogramming protection mode, the reprogramming of the data stored in the vehicle control apparatus 20 based on the new reprogramming instruction is automatically prevented independently of whether the new reprogramming instruction is validated or not.

Next, tasks to be executed by one of the authorized reprogramming stations 11 serving as the target station 11 will be further described hereinafter with reference to FIGS. 4 and 5.

FIG. 4 schematically illustrates a reprogramming-instruction transmitting task to be executed by the target station 11.

The target station 11 starts the reprogramming-instruction transmitting task in response to receiving the reprogramming instruction transmitted from the control center 10. First, the target station 11 transmits, from the antenna 11c to the communication address CA(20) of the vehicle control apparatus 20 of the target vehicle 13, the reprogramming instruction as the modulated carrier waves via cellular phone lines 12 in step S401.

Simultaneously or thereafter, the target station 11 registers, in the rewritable memory 11d, a history of the transmission of the reprogramming instruction to the target vehicle 13 in step S402. Thereafter, the target station 11 terminates the reprogramming-instruction transmitting task.

Figure 5:
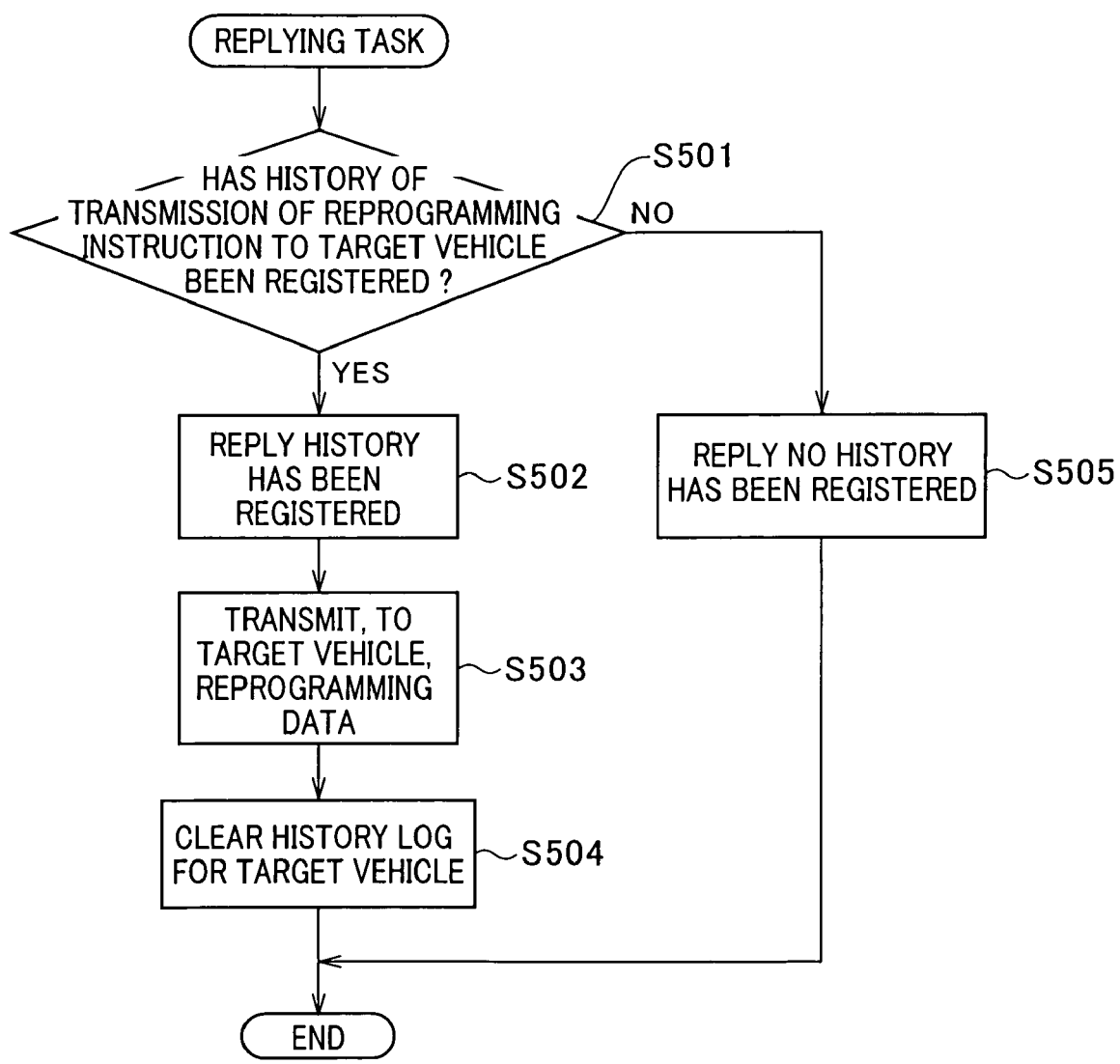
FIG. 5 is a flowchart schematically illustrating a replying task to be executed by the target station illustrated in FIG. 1.

Next, FIG. 5 schematically illustrates a replying task to be executed by the target station 11.

When launching the replying task in response to the query, the target station 11 searches the rewritable memory 11d for the history of the transmission of reprogramming instructions to the target vehicle 13 based on the vehicle code VC(13) of the target vehicle 13 included in the query.

Based on the result of the search, the target station 11 determines whether the history of the transmission of reprogramming instructions to the target vehicle 13 has been registered in the rewritable memory 11d in step S501.

When it is determined that no history of the transmission of reprogramming instructions to the target vehicle 13 has been registered in the rewritable memory 11d (the determination in step S501 is NO), the target station 11 proceeds to step S505. In step S505, the target station 11 transmits, to the vehicle control apparatus 20 of the target vehicle 13, the reply representing that no history of the transmission of reprogramming instructions to the target vehicle 13 has been registered in the rewritable memory 11d in step S505.

Otherwise, when it is determined that the history of the transmission of reprogramming instructions to the target vehicle 13 has been registered in the rewritable memory 11d (the determination in step S501 is YES), the target station 11 proceeds to step S502.

In step S502, the target station 11 transmits, to the vehicle control apparatus 20 of the target vehicle 13, the reply representing that the history of the transmission of the reprogramming instruction to the target vehicle 13 has been registered in the rewritable memory 11d.

Next, the target vehicle 13 transmits, to the vehicle control apparatus 20 of the target vehicle 13, the reprogramming data in step S503. Subsequently, the target vehicle 13 clears the history log for the target vehicle 13 stored in the rewritable memory 11d in step S504.

Next, tasks to be executed by the diagnostic ECU 24 of the vehicle control apparatus 20 of the target vehicle 13 will be further described hereinafter with reference to FIGS. 6 and 7.

Figure 6:
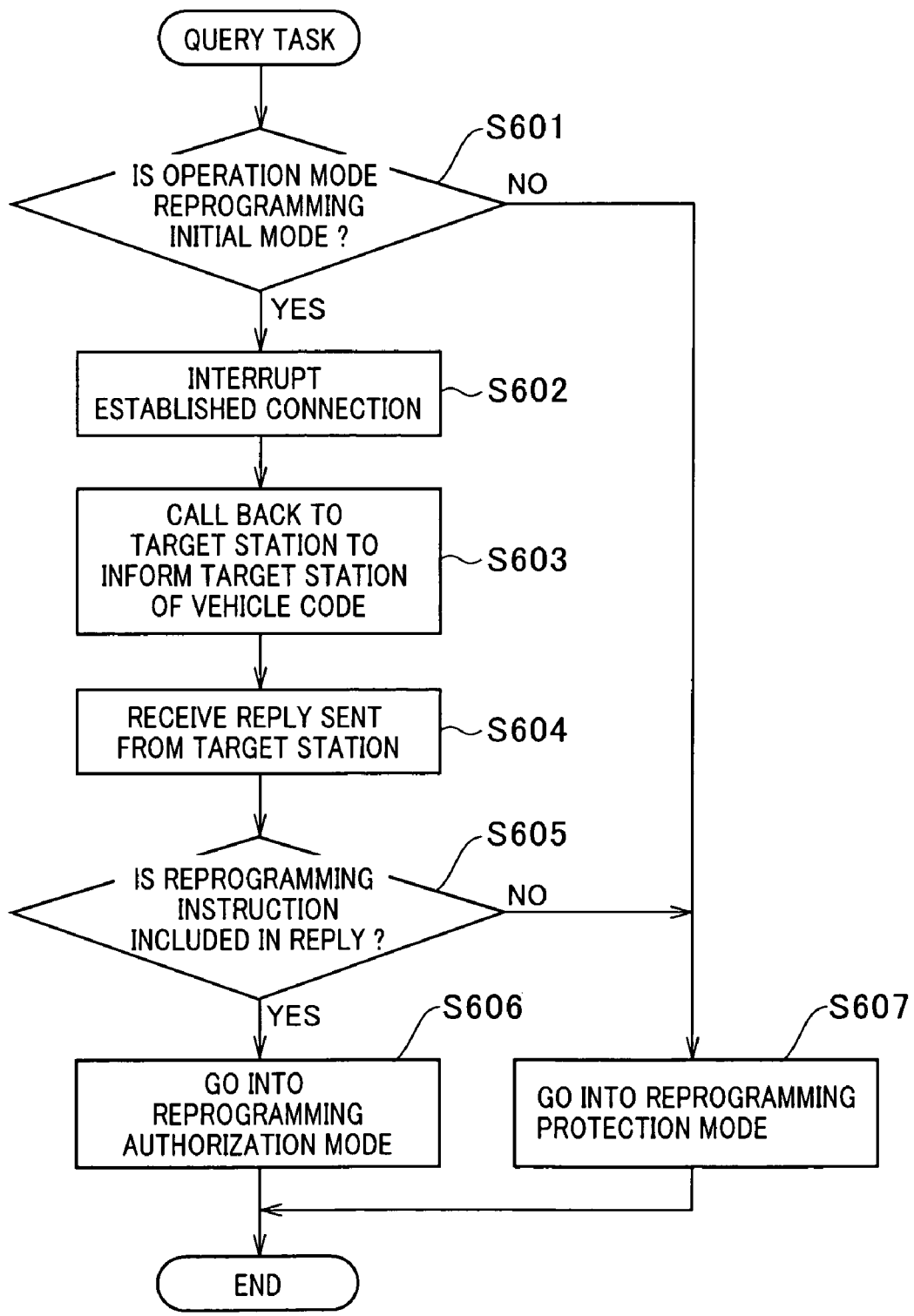
FIG. 6 is a flowchart schematically illustrating a query task to be executed by a diagnostic ECU of a target vehicle illustrated in FIG. 1.

FIG. 6 schematically illustrates a query task to be executed by the diagnostic ECU 24 of the target vehicle 13.

When establishing a connection through the cellular phone lines 12 between the corresponding vehicle control apparatus 20 and the sender of the reprogramming instruction so as to receive the reprogramming instruction, the diagnostic ECU 24 starts the query task.

Specifically, in step S601, the diagnostic ECU 24 determines whether its operation mode is reprogramming initial mode. Note that the reprogramming initial mode represents the operation mode of the diagnostic ECU 24 (the vehicle control apparatus 20) except for the reprogramming authorization mode and the reprogramming protection mode before initially receiving the reprogramming instruction.

When it is determined that the operation mode of the diagnostic ECU 24 of the target vehicle 13 is not the reprogramming initial mode (the determination in step S601 is NO), the diagnostic ECU 24 proceeds to step S607. In step S607, the diagnostic ECU 24 goes into the reprogramming protection mode, terminating the query task.

Otherwise, when it is determined that the operation mode of the diagnostic ECU 24 is the reprogramming initial mode (the determination in step S601 is YES), the diagnostic ECU 24 proceeds to step S602. In step S602, the diagnostic ECU 24 interrupts the established connection.

After the interruption, the diagnostic ECU 24 searches the rewritable memory 28 for the communication address CA(11) of the target station 11 independently of the sender of the received reprogramming instruction. After the search, the diagnostic ECU 24 calls back to the searched communication address CA(11) of the target station 11 in step S603. In step S603, the diagnostic ECU 24 informs the target station 11 of the vehicle code VC(13) of the corresponding target vehicle 13 to thereby ask the target station 11 about whether the history of the transmission of reprogramming instructions to the target vehicle 13 is registered in the target station 11.

As described above, in response to the callback, the target station 11 executes the replying task illustrated in FIG. 5 to thereby transmit the reply to the diagnostic ECU 24.

The diagnostic ECU 24 receives the reply transmitted from the target station 11 in step S604, and determines whether the reply represents that the history of the transmission of the reprogramming instruction to the target vehicle 13 has been registered in the rewritable memory 11 or not in step S605.

When it is determined that the reply represents that the history of the transmission of the reprogramming instruction to the target vehicle 13 has been registered in the rewritable memory 11 (the determination in step S605 is YES), the diagnostic ECU 24 goes into the reprogramming authorization mode in step S606, exiting the query task.

Otherwise, when it is determined that the reply represents that no history of the transmission of the reprogramming instruction to the target vehicle 13 has been registered in the rewritable memory 11 (the determination in step S605 is NO), the diagnostic ECU 24 goes into the reprogramming protection mode in step S607, exiting the query task.

Figure 7:
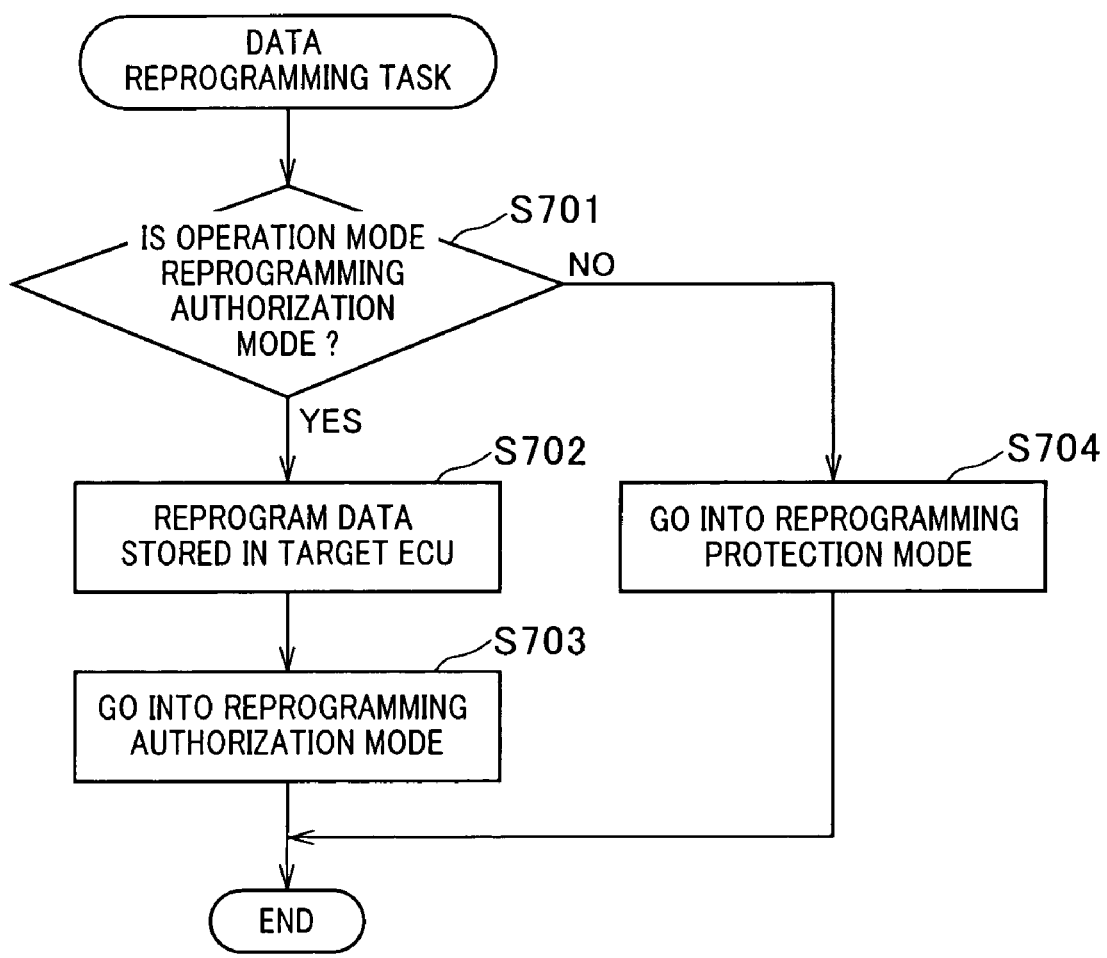
FIG. 7 is a flowchart schematically illustrating a data reprogramming task to be executed by the diagnostic ECU of the target vehicle illustrated in FIG. 1.

Next, FIG. 7 schematically illustrates a data reprogramming task to be executed by the diagnostic ECU 24 of the target vehicle 13.

When starting the data reprogramming task in response to receiving the reprogramming data, the diagnostic ECU 24 determines whether its operation mode is the reprogramming authorization mode in step S701.

When it is determined that the operation mode of the diagnostic ECU 24 is not the reprogramming authorization mode (the determination in step S701 is NO), the diagnostic ECU 24 determines that:

its operation mode has been already shifted to the reprogramming protection mode; or the received reprogramming data is invalidly transmitted via the cellular phone lines 12 while the reply for the query transmitted in step S603 remains unsent.

In any case set forth above, the diagnostic ECU 24 determines that the reprogramming data is invalidly transmitted through the cellular phone lines 12. Then, the diagnostic ECU 24 makes its operation mode unchanged when its operation mode is the reprogramming protection mode in step S704. Otherwise, the diagnostic ECU 24 goes into the reprogramming protection mode when its operation mode is another operation mode in step S704.

Otherwise, when it is determined that the operation mode of the diagnostic ECU 24 is the reprogramming authorization mode (the determination in step S701 is YES), the diagnostic ECU 24 proceeds to step S702. In step S702, the diagnostic ECU 24 reprograms the control program and the control data stored in the target ECU based on the received reprogramming data. Thereafter, the diagnostic ECU 24 goes into the reprogramming initial mode in step S703, exiting the data reprogramming task.

As described above, in the data reprogramming system 100 according to the first embodiment, when receiving a reprogramming instruction, the vehicle control apparatus 20 of one target vehicle 13 asks one of the authorized reprogramming stations 11 about whether the received reprogramming instruction is validated.

Then, the vehicle control apparatus 20 disallows the data reprogramming based on the received reprogramming instruction unless a reply sent from the one of the authorized reprogramming units represents that the received reprogramming instruction is validated. In other words, the vehicle control apparatus 20 disables the data reprogramming based on the received reprogramming instruction when a reply sent from the one of the authorized reprogramming units represents that the received reprogramming instruction is invalid.

This achieves a first effect of appropriately preventing unauthorized data reprogramming based on the invalid reprogramming instruction.

In response to receiving a reprogramming instruction, the vehicle control apparatus 20 of one target vehicle 13 according to the first embodiment asks one of the authorized reprogramming stations 11 about whether the received reprogramming instruction is validated. When receiving the query sent from the target vehicle 13, the one of the authorized reprogramming stations 11 transmits, to the target vehicle 13, a reply indicative of the existence of the history of the transmission of reprogramming instructions to the target vehicle 13. The replay allows the vehicle control apparatus 20 of the target vehicle 13 to verify whether the received reprogramming instruction is validated.

This achieves a second effect of easily and properly verifying the validity of the received reprogramming instruction.

In the first embodiment, when establishing a connection between the vehicle control apparatus 20 and the sender of a reprogramming instruction to receive it, the vehicle control apparatus 20 interrupts the established connection, and reestablishes a connection between the vehicle control apparatus 20 and one of the authorized reprogramming stations 11.

This achieves a third effect of querying one of the authorized reprogramming stations 11 as to whether the received reprogramming instruction is validated independently of the sender of the reprogramming instruction.

In the first embodiment, after the unauthorized reprogramming instruction has been transmitted to the vehicle control apparatus 20 via the cellular phone lines 12, in other words, the data reprogramming system 100 has not been working properly, the vehicle control apparatus 20 continuously disables receipt of the reprogramming instructions. This prevents the vehicle control apparatus 20 from executing the data reprogramming task in response to receiving the reprogramming instructions.

This achieves a fourth effect of disabling the data reprogramming for the vehicle control apparatus 20 under the state in which the reliability of the data reprogramming system 100 cannot be ensured.

Second Embodiment

A data reprogramming system according to a second embodiment of the present invention will be described hereinafter. The data reprogramming system of the second embodiment has substantially the same structure as that of the data reprogramming system 100 of the first embodiment except for some differences described hereinafter. For this reason, like reference characters are assigned to like parts in the data reprogramming systems according to the first and second embodiments so that descriptions of the parts of the data reprogramming system of the second embodiment will be omitted.

In the first embodiment, the vehicle control apparatus 20 of the target vehicle 13 is programmed to ask one of the authorized reprogramming stations 11 about whether a reprogramming instruction received thereby is validated. This prevents unauthorized data reprogramming based on the unauthorized reprogramming instruction based on the premise that the one of the authorized reprogramming stations 11 normally operates.

As an example of the circumstances where an unauthorized reprogramming instruction is transmitted via the cellular phone lines 12, an authorized reprogramming station may fail so that it may transmit a reprogramming instruction although the control center 10 does not generate an authorized reprogramming instruction.

In this circumstance, even if the vehicle control apparatus 20 of a target vehicle 13 asks the failed station 11 about whether the reprogramming instruction transmitted from the failed station 11, it may be difficult for the vehicle control apparatus 20 to receive proper replies from the failed station 11 so that unauthorized data reprogramming may be executed.

Specifically, after the reprogramming instruction has been transmitted from the failed station 11, the history of the transmission of reprogramming instructions can be stored in the rewritable memory 11$d$ although the reprogramming instruction is invalidly transmitted from the failed station 11. At that time, when receiving a query of whether the reprogramming instruction sent from the failed station 11 is validated, the failed station 11 may transmit, to the vehicle control apparatus 20, a reply representing that the history of the transmission of reprogramming instructions has been stored therein. This may result that the vehicle control apparatus 20 misjudges that the reprogramming instruction sent from the failed station 11 is validated.

In order to address the misjudge of the vehicle control apparatus 20, the vehicle control apparatus 20 according to the second embodiment is configured to ask the control center 10 about whether a reprogramming instruction received thereby is validated. Specifically, even if a reprogramming instruction is invalidly transmitted from the failed station 11 so that the history of the transmission of reprogramming instructions has been stored in the rewritable memory 11$d$, no history of the transmission of reprogramming instructions has been stored in the rewritable memory 10$d$ of the control center 10.

For this reason, querying the control center 10 as to whether the history of the transmission of reprogramming instructions has been stored therein properly checks the validity of a reprogramming instruction even if one of the authorized reprogramming stations 11 is malfunctioned to erroneously transmit the reprogramming instruction.

Figure 8:
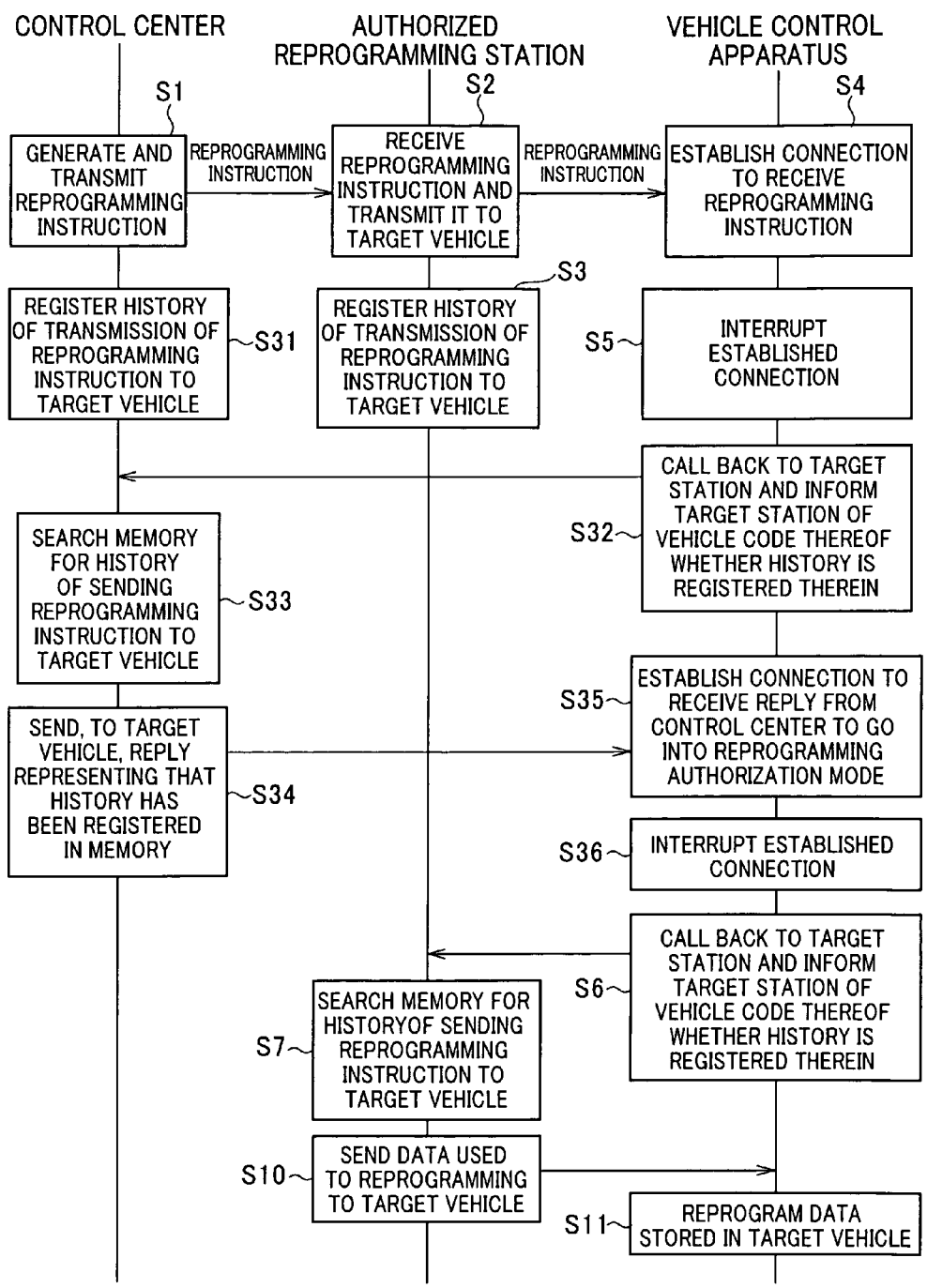
FIG. 8 is a sequence diagram schematically illustrating a routine to be executed by the data reprogramming system according to a second embodiment of the present invention to thereby enable data reprogramming based on a reprogramming instruction sent from one of the authorized reprogramming stations.

FIG. 8 schematically illustrates a routine to be executed by the data reprogramming system 100 according to the second embodiment to thereby enable the data reprogramming based on the reprogramming instruction sent from one of the authorized reprogramming stations 11.

As described above, the control center 10 transmits, from the antenna 10$c$ to the communication address CA(11) of a target station 11 corresponding to a target vehicle 13, the reprogramming instruction via cellular phone lines 12 in step S1.

Simultaneously or thereafter, the control center 10 registers, in the rewritable memory 10$d$, a history of the transmission of reprogramming instructions to the target vehicle 13 in step S31. For example, the history is stored in the rewritable memory 10$d$ to be associated with the vehicle code VC(13) of the target vehicle 13.

The target station 11 receives, via the antenna 11$c$, the reprogramming instruction transmitted from the control center 10. The target station 11 transmits, from the antenna 11$c$ to the communication address CA(20) of the vehicle control apparatus 20 of the target vehicle 13, the reprogramming instruction in step S2.

Simultaneously or thereafter, the target station 11 registers, in the rewritable memory 11$d$, a history of the transmission of reprogramming instructions to the target vehicle 13 in step S3. For example, the history is stored in the rewritable memory 11$d$ to be associated with the vehicle code VC(13) of the target vehicle 13.

When the reprogramming instruction is transmitted from the target station 11, the diagnostic ECU 24 of the vehicle control apparatus 20 of the target vehicle 13 establishes a connection through the cellular phone lines 12 between the target station 11 and the corresponding vehicle control apparatus 20 to thereby receive, via the antenna 27$a$, the reprogramming instruction in step S4.

Next, the diagnostic ECU 24 interrupts the established connection in step S5.

Thereafter, the diagnostic ECU 24 searches the rewritable memory 28 for the communication address CA(10) of the control center 10. Then, the diagnostic ECU 24 calls back to the searched communication address CA(10) of the control center 10 in step S32. In other words, the diagnostic ECU 24 reestablishes a connection through the cellular phone lines 12 between the corresponding vehicle control apparatus 20 and the control center 10 based on the searched communication address CA(10) in step S32.

In step S32, the diagnostic ECU 24 informs the control center 10 of the vehicle code VC(13) of the corresponding target vehicle 13 to thereby ask the control center 10 about whether the history of the transmission of reprogramming instructions to the target vehicle 13 is registered in the control center 10.

When receiving the query including the vehicle code VC(13) of the target vehicle 13, the control center 10 searches the rewritable memory 10$d$ for the history of the transmission of reprogramming instructions to the target vehicle 13 based on the vehicle code VC(13) of the target vehicle 13 in step S33.

At that time, the history of the transmission of reprogramming instructions to the target vehicle 13 has been registered in the rewritable memory 10$d$ (see step S31). For this reason, the control center 10 transmits, to the vehicle control apparatus 20 of the target vehicle 13, a reply representing that the history of the transmission of reprogramming instructions to the target vehicle 13 has been registered in the rewritable memory 10$d$ in step S34.

When the reply is transmitted from the control center 10, the diagnostic ECU 24 of the vehicle control apparatus 20 of the target vehicle 11 establishes a connection through the cellular phone lines 12 between the control center 20 and the corresponding vehicle control apparatus 20 in step S35. In step S35, the diagnostic ECU 24 receives, via the antenna 27$a$, the reply representing that the history of the transmission of reprogramming instructions to the target vehicle 13 has been registered in the control center 10.

Based on the received reply, the diagnostic ECU 24 determines that the received reprogramming instruction is validated. Then, the diagnostic ECU 24 goes into the reprogramming authorization mode in step S35.

Next, the diagnostic ECU 24 interrupts the established connection in step S36.

Thereafter, the diagnostic ECU 24 searches the rewritable memory 28 for the communication address CA(11) of the target station 11. Then, the diagnostic ECU 24 reestablishes a connection through the cellular phone lines 12 between the corresponding vehicle control apparatus 20 and the target station 11 based on the searched communication address CA(11) in step S37.

In step S37, the diagnostic ECU 24 transmits, to the target station 11, a request therefor to transmit reprogramming data; this request includes the vehicle code VC(13) of the target vehicle 13. The reprogramming data is required to reprogram the control program and the control data stored in the target ECU.

When receiving the request, the target station 11 searches the rewritable memory 11$d$ for the history of the transmission of reprogramming instructions to the target vehicle 13 based on the vehicle code VC(13) of the target vehicle 13 in step S7.

At that time, the history of the transmission of reprogramming instructions to the target vehicle 13 has been registered in the rewritable memory 11$d$ (see step S3). For this reason, the target station 11 transmits, to the vehicle control apparatus 20 of the target vehicle 13, the reprogramming data in step S10.

When receiving the reprogramming data, the diagnostic ECU 24 reprograms at least part of the control program and/or the control data based on the received reprogramming instruction and on the received reprogramming data in step S11.

In contrast, FIG. 9 schematically illustrates a routine to be executed by the data reprogramming system 100 when one failed or malfunctioned reprogramming station 11 erroneously transmits a reprogramming instruction independently of the generation of a reprogramming instruction by the control center 10. Hereinafter, the reprogramming instruction to be erroneously sent from the failed or malfunctioned reprogramming station 11 will be referred to as "unauthorized reprogramming instruction".

When the unauthorized reprogramming instruction is transmitted from the failed or malfunctioned reprogramming station 11, the diagnostic ECU 24 of the vehicle control apparatus 20 of the target vehicle 13 establishes a connection through the cellular phone lines 12 between the failed or malfunctioned reprogramming station 11 and the corresponding vehicle control apparatus 20. Then, the diagnostic ECU 24 receives, via the antenna 27a, the unauthorized reprogramming instruction in step S20.

Next, the diagnostic ECU 24 interrupts the established connection in step S21.

Thereafter, the diagnostic ECU 24 searches the rewritable memory 28 for the communication address CA(10) of the control center 10. Then, the diagnostic ECU 24 reestablishes a connection through the cellular phone lines 12 between the corresponding vehicle control apparatus 20 and the control center 10 based on the searched communication address CA(10) in step S32.

In step S32, the diagnostic ECU 24 informs the control center 10 of the vehicle code VC(13) of the corresponding target vehicle 13 to thereby ask the control center 10 about whether the history of the transmission of reprogramming instructions to the target vehicle 13 is registered in the control center 10.

When receiving the query including the vehicle code VC(13) of the target vehicle 13, the control center 10 searches the rewritable memory 10d for the history of the transmission of reprogramming instructions to the target vehicle 13 based on the vehicle code VC(13) of the target vehicle 13 in step S33.

At that time, no history of the transmission of reprogramming instructions to the target vehicle 13 has been registered in the rewritable memory 10d (see step S31). For this reason, the control center 10 transmits, to the vehicle control apparatus 20 of the target vehicle 13, a reply representing that no history of the transmission of reprogramming instructions to the target vehicle 13 has been registered in the rewritable memory 10d in step S40.

When the reply is transmitted from the control center 10, the diagnostic ECU 24 of the vehicle control apparatus 20 of the target vehicle 11 establishes a connection through the cellular phone lines 12 between the control center 20 and the corresponding vehicle control apparatus 20 in step S41. In step S41, the diagnostic ECU 24 receives, via the antenna 27a, the reply representing that no history of the transmission of reprogramming instructions to the target vehicle 13 has been registered in the control center 10.

Next, in step S42, the diagnostic ECU 24 determines that the received reprogramming instruction is invalid, the diagnostic ECU 24 goes into the reprogramming protection mode.

In the reprogramming protection mode, the diagnostic ECU 24 disables reprogramming of the control program and the control data stored in the target ECU based on the unauthorized reprogramming instruction.

Next, tasks to be executed by the control center 10 will be further described hereinafter with reference to FIGS. 10 and 11.

FIG. 10 schematically illustrates a reprogramming-instruction generating task to be executed by the control center 10.

When launching the reprogramming-instruction generating task, the control center 10 generates a reprogramming instruction. The reprogramming instruction is to reprogram the control program and the control data stored in a target ECU of the vehicle control apparatus 20 of the target vehicle 13.

Then, the control center 10 transmits, from the antenna 10c to the communication address CA(11) of the target station 11 corresponding to the target vehicle 13, the reprogramming instruction via cellular phone lines 12 in step S1001.

Simultaneously or thereafter, the control center 10 registers, in the rewritable memory 10d, a history of the transmission of reprogramming instructions to the target vehicle 13 in step S1002. Thereafter, the control center 10 terminates the reprogramming-instruction generating task.

Figure 11:
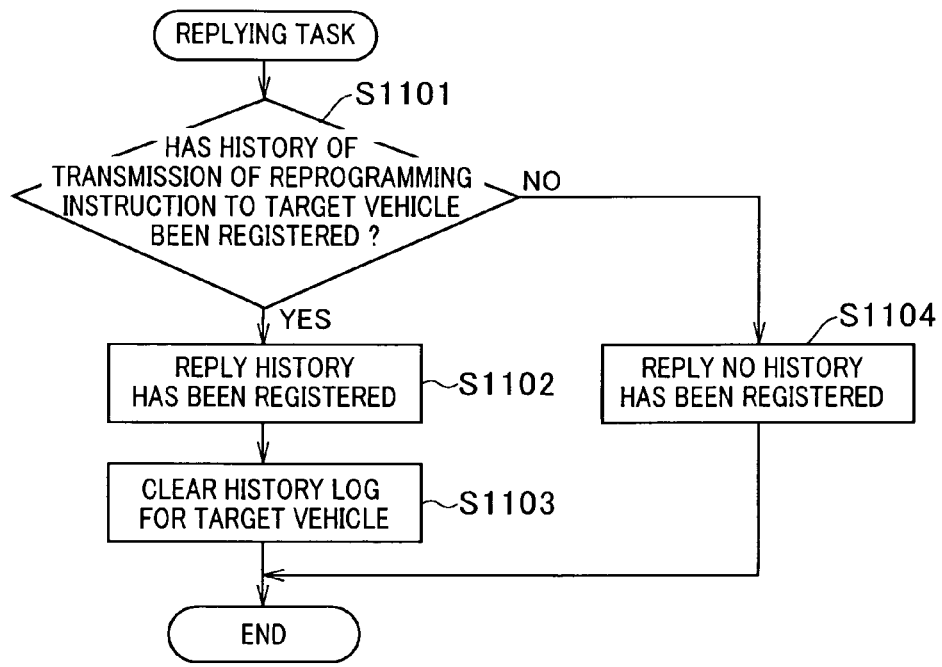
FIG. 11 is a flowchart schematically illustrating a replying task to be executed by the control center according to the second embodiment.

Next, FIG. 11 schematically illustrates a replying task to be executed by the control center 10.

When launching the replying task in response to the query, the control center 10 searches the rewritable memory 10d for the history of the transmission of reprogramming instructions to the target vehicle 13 based on the vehicle code VC(13) of the target vehicle 13 included in the query.

Based on the result of the search, the control center 10 determines whether the history of the transmission of reprogramming instructions to the target vehicle 13 has been registered in the rewritable memory 10d in step S1101.

When it is determined that the history of the transmission of reprogramming instructions to the target vehicle 13 has been registered in the rewritable memory 10d (the determination in step S1101 is YES), the control center 10 proceeds to step S1102.

In step S1102, the control center 10 transmits, to the vehicle control apparatus 20 of the target vehicle 13, the reply representing that the history of the transmission of the reprogramming instruction to the target vehicle 13 has been registered in the rewritable memory 10d.

Next, the control center 10 clears the history log for the target vehicle 13 stored in the rewritable memory 10d in step S1103.

Otherwise, when it is determined that no history of the transmission of reprogramming instructions to the target vehicle 13 has been registered in the rewritable memory 10d (the determination in step S1101 is NO), the control center 10 proceeds to step S1104. In step S1104, the control center 10 transmits, to the vehicle control apparatus 20 of the target vehicle 13, the reply representing that no history of the transmission of reprogramming instructions to the target vehicle 13 has been registered in the rewritable memory 10d.

Figure 12:
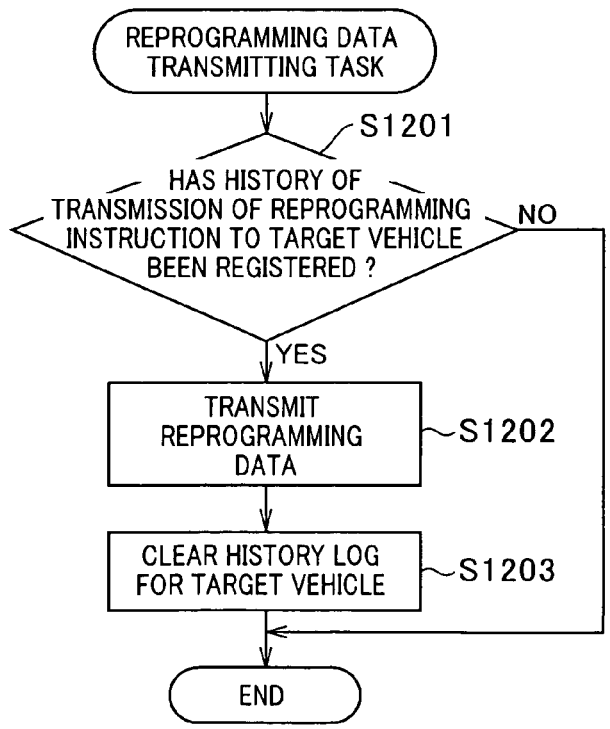
FIG. 12 is a flowchart schematically illustrating a reprogramming-data transmitting task to be executed by the target station according to the second embodiment.

Next, a reprogramming-data transmitting task to be executed by the target station 11 will be further described hereinafter with reference to FIG. 12. Note that, in the second embodiment, the target station 11 is programmed to carry out the reprogramming-instruction transmitting task illustrated in FIG. 4 in response to receiving the reprogramming instruction generated by the control center 10.

When launching the reprogramming-data transmitting task in response to receiving the request, the target station 11 searches the rewritable memory 11d for the history of the transmission of reprogramming instructions to the target vehicle 13 based on the vehicle code VC(13) of the target vehicle 13 included in the request.

Based on the result of the search, the target station 11 determines whether the history of the transmission of reprogramming instructions to the target vehicle 13 has been registered in the rewritable memory 11d in step S1201.

When it is determined that the history of the transmission of reprogramming instructions to the target vehicle 13 has been registered in the rewritable memory 11d (the determination in step S1201 is YES), the target station 11 proceeds to step S1202.

In step S1202, the target station 11 transmits, to the vehicle control apparatus 20 of the target vehicle 13, the reprogramming data.

Next, the target vehicle 13 clears the history log for the target vehicle 13 stored in the rewritable memory 11d in step S1203.

Otherwise, when it is determined that no history of the transmission of reprogramming instructions to the target vehicle 13 has been registered in the rewritable memory 11*d* (the determination in step S1201 is NO), the target station 11 terminates the reprogramming-data transmitting task.

Next, tasks to be executed by the diagnostic ECU 24 of the vehicle control apparatus 20 of the target vehicle 13 will be further described hereinafter with reference to FIGS. 13 and 14. Note that, in the second embodiment, the diagnostic ECU 24 of the vehicle control apparatus 20 of the target vehicle 13 is programmed to carry out the data reprogramming task illustrated in FIG. 7 in response to receiving the reprogramming data transmitted from the target station 11.

Figure 13:
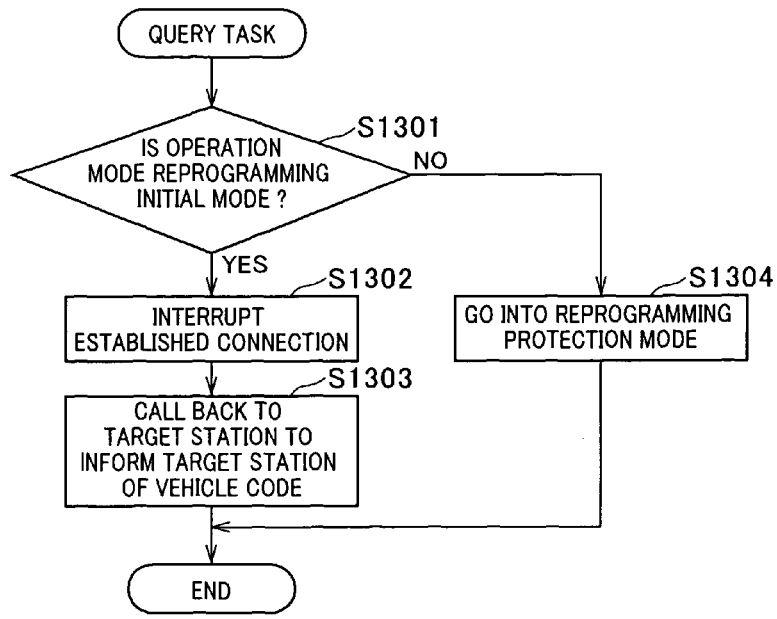
FIG. 13 is a flowchart schematically illustrating a query task to be executed by the diagnostic ECU of the target vehicle according to the second embodiment.

FIG. 13 schematically illustrates a query task to be executed by the diagnostic ECU 24 of the target vehicle 13.

When establishing a connection through the cellular phone lines 12 between the corresponding vehicle control apparatus 20 and the sender of the reprogramming instruction so as to receive the reprogramming instruction, the diagnostic ECU 24 starts the query task.

Specifically, in step S1301, the diagnostic ECU 24 determines whether its operation mode is the reprogramming initial mode.

When it is determined that the operation mode of the diagnostic ECU 24 of the target vehicle 13 is not the reprogramming initial mode (the determination in step S1301 is NO), the diagnostic ECU 24 proceeds to step S1304. In step S1304, the diagnostic ECU 24 goes into the reprogramming protection mode, terminating the query task.

Otherwise, when it is determined that the operation mode of the diagnostic ECU 24 is the reprogramming initial mode (the determination in step S1301 is YES), the diagnostic ECU 24 proceeds to step S1302. In step S1302, the diagnostic ECU 24 interrupts the established connection.

After the interruption, the diagnostic ECU 24 searches the rewritable memory 28 for the communication address CA(10) of the control center 10 independently of the sender of the received reprogramming instruction. After the search, the diagnostic ECU 24 calls back to the searched communication address CA(10) of the control center 10 in step S1303. In step S1303, the diagnostic ECU 24 informs the control center 10 of the vehicle code VC(13) of the corresponding target vehicle 13 to thereby ask the control center 10 about whether the history of the transmission of reprogramming instructions to the target vehicle 13 is registered in the control center 10.

Figure 14:
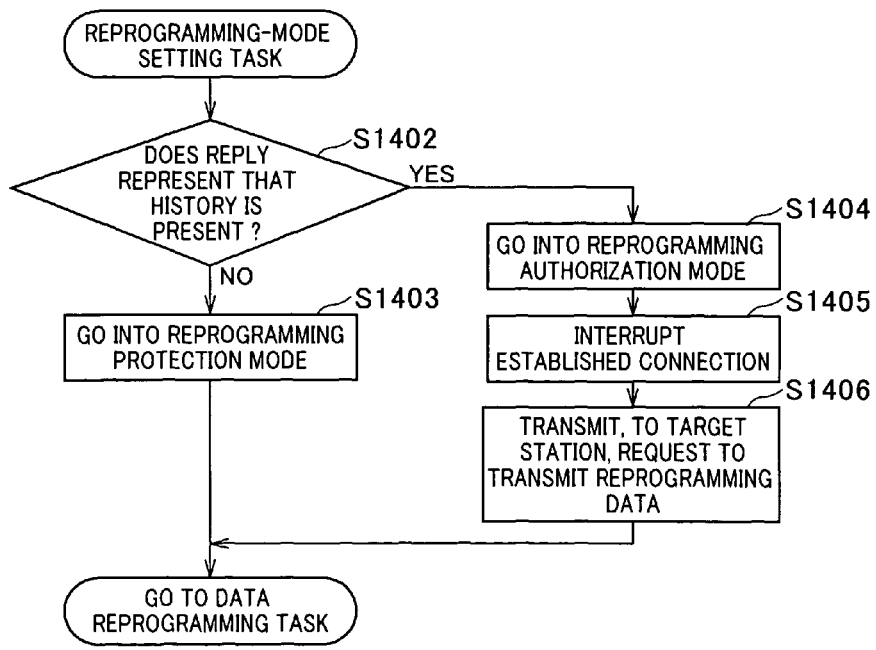
FIG. 14 is a flowchart schematically illustrating a reprogramming-mode setting task to be executed by the diagnostic ECU of the target vehicle according to the second embodiment.

Next, FIG. 14 schematically illustrates a reprogramming-mode setting task to be executed by the diagnostic ECU 24 of the target vehicle 13.

When the query task is carried out by the diagnostic ECU 24 of the target vehicle 13, the replying task illustrated in FIG. 11 is performed by the control center 10. This results that the reply indicative of the existence of the history of the transmission of reprogramming instructions to the target vehicle 13 is returned from the control center 10 to the vehicle control apparatus 20 of the target vehicle 13.

When establishing a connection between the vehicle control apparatus 20 and the control center 10 to receive the reply, the diagnostic ECU 24 of the target vehicle 13 starts the reprogramming-mode setting task.

Specifically, the diagnostic ECU 24 of the target vehicle 13 determines whether the reply represents that the history of the transmission of reprogramming instructions is present in step S1402.

When it is determined that the reply represents that the history of the transmission of reprogramming instructions is not present (the determination in step S1402 is NO), the diagnostic ECU 24 determines that the received reprogramming instruction is invalid. Then, the diagnostic ECU 24 goes into the reprogramming protection mode in step S1403, exiting the reprogramming-mode setting task.

Otherwise, when it is determined that the reply represents that the history of the transmission of reprogramming instructions is present (the determination in step S1402 is YES), the diagnostic ECU 24 determines that the received reprogramming instruction is validated. Then, the diagnostic ECU 24 goes into the reprogramming authorization mode in step S1404.

Next, the diagnostic ECU 24 interrupts the established connection in step S1405, and reestablishes a connection between the vehicle control apparatus 20 and the target reprogramming station 11 in step S1406.

In step S1406, the diagnostic ECU 24 transmits, to the target station 11, the request therefor to transmit the reprogramming data. Thereafter, when receiving the reprogramming data sent from the target station 11, the diagnostic ECU 24 starts to execute the data reprogramming task illustrated in FIG. 7.

As described above, in the data reprogramming system 100 according to the second embodiment, the vehicle control apparatus 20 one target vehicle 13 asks the control center 10 about whether a received reprogramming instruction is validated.

This achieves, in addition to the first to fourth effects, a fifth effect of disabling, when a failed or malfunctioned station 11 erroneously transmits an unauthorized reprogramming instruction, invalid data reprogramming based on the unauthorized reprogramming instruction.

In each of the first and second embodiments, after going into the reprogramming protection mode, the vehicle control apparatus 20 continuously operates in the reprogramming protection mode while disabling receipt of the reprogramming instructions, in other words, disabling the data reprogramming based on the reprogramming instructions.

Specifically, in a state that the unauthorized reprogramming instruction has been transmitted to the vehicle control apparatus 20 via the cellular phone lines 12, there is a possibility that a failure occurs in the data reprogramming system 100 so that the transmission of the unauthorized reprogramming instruction can be repeated. For this reason, it is effective to disable receipt of the reprogramming instructions after the vehicle control apparatus 20 has gone into the reprogramming protection mode.

However, even if the unauthorized reprogramming instruction is repeatedly transmitted to the vehicle control apparatus 20 of the target vehicle 13, the vehicle control apparatus 20 can check the validity of the unauthorized reprogramming instruction every time the unauthorized reprogramming instruction is received. This prevents invalid data-reprogramming based on the unauthorized reprogramming instructions.

Specifically, the vehicle control apparatus 20 can reset the reprogramming protection mode every time a reprogramming request is received.

For example, in the query task illustrated in FIG. 6 or FIG. 13, the vehicle control apparatus 20 can forcibly go into the reprogramming initial mode when the query task illustrated in FIG. 6 has been completed.

More specifically, in the first embodiment, when starting the query task in response to receiving a reprogramming instruction, the diagnostic ECU 24 can set its operation mode to the reprogramming initial mode in step S601, and thereafter can execute the operations in steps S602 to S607.

In the second embodiment, when starting the query task in response to receiving a reprogramming instruction, the diagnostic ECU 24 can set its operation mode to the reprogramming initial mode in step S1301, and thereafter can execute the operations in steps S1302 to S1304.

In each of the first and second embodiments, the transmissions of the reprogramming instructions, the reprogramming data, the queries to check the validity of each of the received reprogramming instructions are carried out via the cellular phone lines 12. The present invention is not limited to the structure. Specifically, the transmissions of the reprogramming instructions, the reprogramming data, and the queries to check the validity of each of the received reprogramming instructions can be carried out via another wireless communication network.

Third Embodiment

A data reprogramming system according to a third embodiment of the present invention will be described hereinafter. The data reprogramming system of the third embodiment has substantially the same structure as that of the data reprogramming system 100 of the first embodiment except for some differences described hereinafter. For this reason, like reference characters are assigned to like parts in the data reprogramming systems according to the first and third embodiments so that descriptions of the parts of the data reprogramming system of the third embodiment will be omitted.

In each of the first and second embodiments, when it is determined that a reprogramming instruction transmitted to each of the motor vehicles 13 is invalid, the vehicle control apparatus 20 of each of the motor vehicles 13 is configured to disable the data reprogramming based on the invalid reprogramming instruction.

In contrast, in the third embodiment, when it is determined that a reprogramming instruction transmitted to each of the motor vehicles 13 is invalid, a data reprogramming system 100A according to the third embodiment simultaneously disables data reprogramming of all of the motor vehicles 13.

Specifically, in the third embodiment, when it is determined that a reprogramming instruction transmitted to each of the motor vehicles 13 is invalid or likely to be invalid, the control center 10 works to broadcast, to the vehicle control apparatuses 20 of all of the motor vehicles 13, an instruction to disable data reprogramming. In particular, under circumstances in which the reprogramming instructions are invalidly transmitted via the cellular phone lines 12, communications via the cellular phone lines 12 cannot be guaranteed in validity. For this reason, under the circumstances, when the cellular phone lines 12 are used to broadcast, to the vehicle control apparatuses 20 of all of the motor vehicles 13, the instruction to disable data reprogramming, it may be difficult to reliably inform all of the motor vehicles 13 of the instruction to disable data reprogramming.

In order to address the problem set forth above, in the third embodiment, the control center 10 works to broadcast, to the vehicle control apparatuses 20 of all of the motor vehicles 13, an instruction to disable data reprogramming through an alternative radio communication network except for the cellular phone lines 12. The instruction to disable data reprogramming will be referred to as "disable reprogramming instruction".

Figure 15:
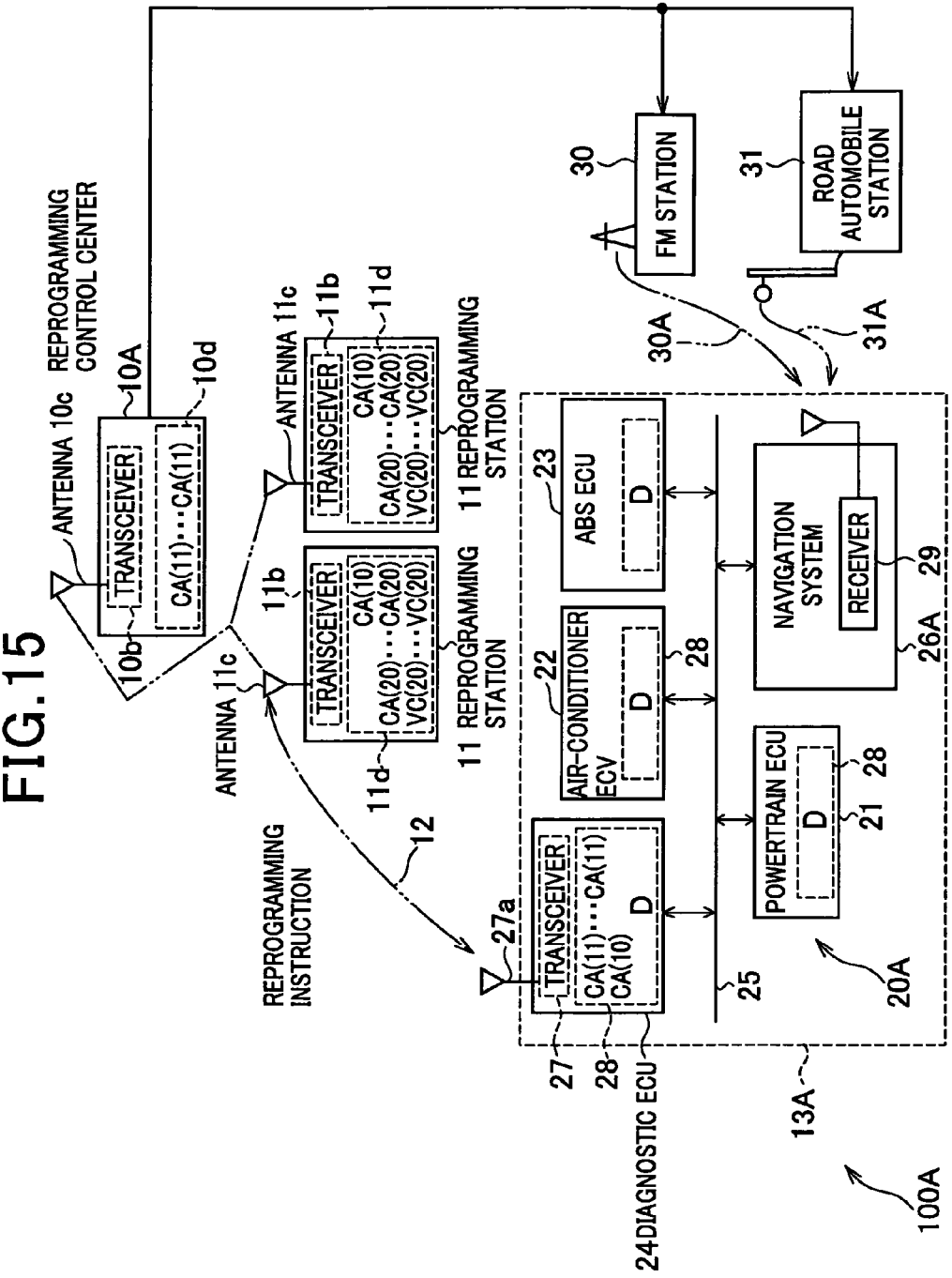
FIG. 15 is a block diagram schematically illustrating an example of the configuration of a data reprogramming system according to a third embodiment of the present invention.

Referring to FIG. 15, a data reprogramming system 100A according to the third embodiment is equipped with a reprogramming control center 10A, a plurality of reprogramming stations 11 under the control of the control center 10A, and a vehicle control apparatus 20 of each of motor vehicles 13A. The combinations of the respective reprogramming stations 11 and the control center 10A will be referred to as "data reprogramming units 102" hereinafter. The data reprogramming units 102 share the control center 10A.

As well as each of the first and second embodiments, one of the reprogramming stations 11 corresponding to at least one of the motor vehicles 13 works to transmit a reprogramming instruction to the vehicle control apparatus 20A of each of the motor vehicles 13A via the cellular phone lines 12.

In addition, the data reprogramming system 100A is equipped with a frequency modulation (FM) broadcast station 30 and a road automobile communication station 31. The FM broadcast station 30 works to broadcast frequency-modulated multiplex signals over at least the predetermined geographic area. The road automobile communication station 31 works to transmit road traffic information via infrared (optical) beacons and/or radio beacons located along loads of the regions of the predetermined geographic area.

The control center 10A is communicably coupled to the FM broadcast station 30 and the road automobile communication station 31. The control center 10A is operative to broadcast, to the vehicle control apparatus 20A of each of the motor vehicles 13A, the disable reprogramming instruction via the FM broadcast station 30 and/or the road automobile communication station 31 by way of an FM multiplex broadcast network 30A and/or an infrared or radio communication network 31A.

A navigation system 26A of the vehicle control apparatus 20A of each of the motor vehicles 13A is equipped with a receiver 29. The receiver 29 is operative to receive the disable reprogramming instructions transmitted from the control center 10A via the FM broadcast station 30 and/or the road automobile communication station 31.

Figure 16:
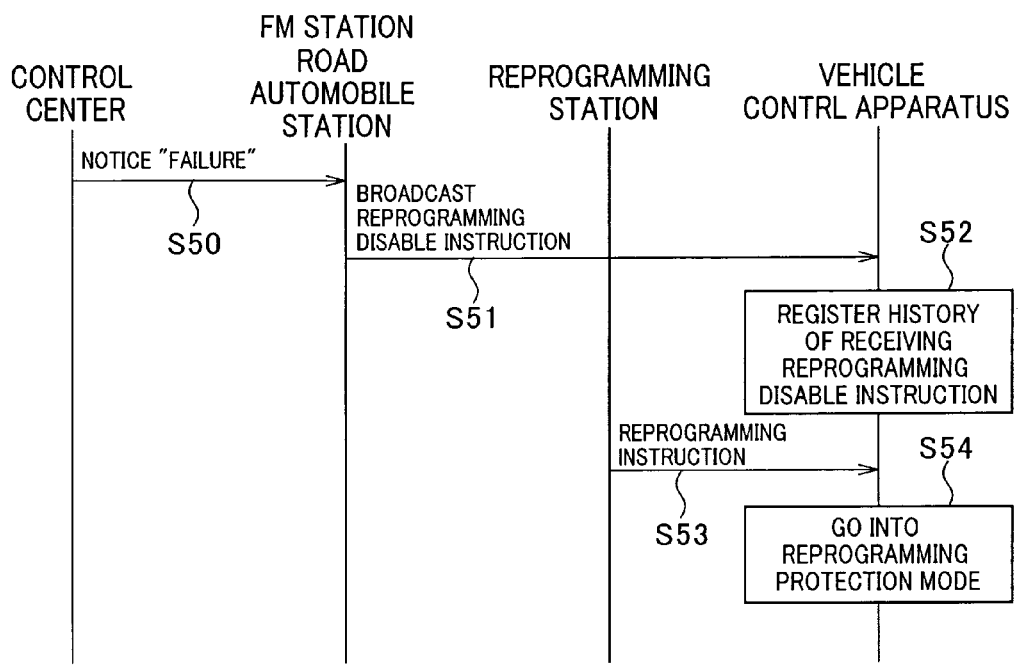
FIG. 16 is a sequence diagram schematically illustrating a routine to be executed by the data reprogramming system to thereby broadcast a reprogramming disable instruction according to the third embodiment.

FIG. 16 schematically illustrates a routine to be executed by the data reprogramming system 100A to thereby broadcast the reprogramming disable instruction.

When it is determined that a reprogramming instruction to be transmitted to each of the motor vehicles 13 is invalid or likely to be invalid, the control center 10A informs the FM broadcast station 30 and the road automobile communication station 31 of "failure" in step S50.

When receiving the notice "failure", the FM broadcast station 30 and the road automobile communication system 31 broadcast the reprogramming disable instruction to the vehicle control apparatus 20A of each of the motor vehicles 13A via the FM multiplex broadcast network 30A and the infrared or radio communication network 31A in step S51.

When receiving the reprogramming disable instruction, the vehicle control apparatus 20A of each of the motor vehicles 13A registers in at least one rewritable memory 28 a history of receiving the reprogramming disable instruction in step S52.

In a state that the history of receiving the reprogramming disable instruction has been stored in the at least one rewritable memory 28, when receiving a reprogramming instruction transmitted from a reprogramming station 11 in step S53, the vehicle control apparatus 20A goes into the reprogramming protection mode in step S54. This disables the vehicle control apparatus 20A to reprogram the control program and the control data stored in at least one target ECU based on the received reprogramming instruction.

Figure 17:
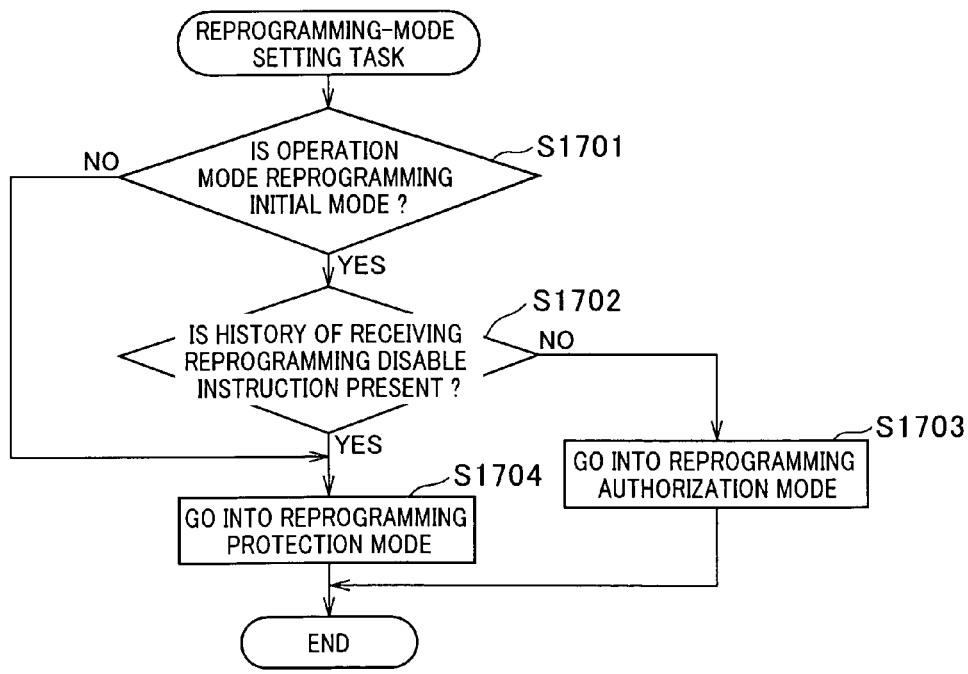
FIG. 17 is a sequence diagram schematically illustrating a reprogramming-mode setting task to be executed by a vehicle control apparatus of each of motor vehicles illustrated in FIG. 15 according to the third embodiment.

FIG. 17 schematically illustrates a reprogramming-mode setting task to be executed by the vehicle control apparatus 20A of each of the motor vehicles 13A according to the third embodiment.

When establishing a connection between the vehicle control apparatus 20A and a target station 11 to receive a reprogramming instruction, the vehicle control apparatus 20A of each of the motor vehicles 13A starts the reprogramming-mode setting task.

Specifically, the vehicle control apparatus 20A determines whether the current operation mode thereof is the reprogramming initial mode in step S1701.

When it is determined that the current operation mode thereof is not the reprogramming initial mode (the determination in step S1701 is NO), the vehicle control apparatus 20A goes into the reprogramming protection mode in step S1704, exiting the reprogramming-mode setting task.

Otherwise, when it is determined that the current operation mode thereof is the reprogramming initial mode (the determination in step S1701 is YES), the vehicle control apparatus 20A determines whether the history of receiving the reprogramming disable instruction in step S1702.

When the history of receiving the reprogramming disable instruction has been registered in the vehicle control apparatus 20A (the determination in step S1702 is YES), the vehicle control apparatus 20A goes into the reprogramming protection mode in step S1704, exiting the reprogramming-mode setting task.

In contrast, when the history of receiving the reprogramming disable instruction has not been registered in the vehicle control apparatus 20A (the determination in step S1702 is NO), the vehicle control apparatus 20A goes into the reprogramming authorization mode in step S1703, exiting the reprogramming-mode setting task.

Note that, after the reprogramming-mode setting task has been completed, when receiving the reprogramming data, the vehicle control apparatus 20A carries out the data reprogramming task illustrated in FIG. 7 to thereby execute the data reprogramming on the conditions that the operation mode of the apparatus 20A is the reprogramming authorization mode. When the data reprogramming has been completed, the vehicle control apparatus 20 goes into the reprogramming initial mode.

As described above, in the third embodiment, the control center 10A works to broadcast, to the vehicle control apparatuses 20A of all of the motor vehicles 13A, the reprogramming disable instruction through an alternative wireless communication network (the FM multiplex broadcast network 30A and/or the infrared or radio communication network 31A) except for the cellular phone lines 12.

This achieves a sixth effect of disabling date reprogramming of the vehicle control apparatus 20 of each vehicle 13 even if a failure occurs in the cellular phone lines 12.

In the third embodiment, the cellular phone lines 12 is used for transmitting the reprogramming instructions, and the FM multiplex broadcast network 30A and the infrared or radio communication network 31A are used for transmitting the reprogramming disable instructions. The present invention is however not limited to the combination. Specifically, one of the wireless communication networks and another one thereof can be used for transmitting the reprogramming instructions and the reprogramming disable instructions, respectively.

This allows transmissions of the reprogramming disable instructions even if a failure occurs in the one of the wireless communication networks for transmitting the reprogramming instructions.

Modifications

In each of the first to third embodiments, after going into the reprogramming protection mode, the vehicle control apparatus 20, 20A of each of the motor vehicles 13, 13A continuously operates in the reprogramming protection mode while disabling data reprogramming even when receiving the reprogramming instructions.

As a modification, the vehicle control apparatus 20, 20A of each of the motor vehicles 13, 13A returns from the reprogramming protection mode to the reprogramming initial mode when at least one of the following first and second conditions is met:

The first condition is that a predetermined period has elapsed since the shift of the operation mode to the reprogramming protection mode.

The second condition is to receive a return instruction transmitted from, for example, the control center 10, 10A.

Figure 18:
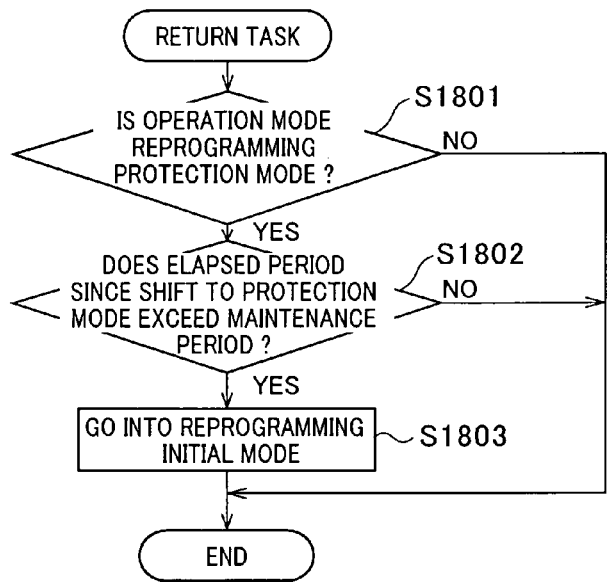
FIG. 18 is a flowchart schematically illustrating a return task to be executed by the vehicle control apparatus of each of the motor vehicles 13 using the first condition according to a modification of each of the first to third embodiments of the present invention.

FIG. 18 schematically illustrates a return task to be executed by the vehicle control apparatus 20 of each of the motor vehicles 13 using the first condition. The return task is executed by the vehicle control apparatus 20 each time an interrupt periodically occurs.

When starting the return task, the vehicle control apparatus 20 determines whether its operation mode is the reprogramming protection mode in step S1801. When it is determined that the operation mode is not the reprogramming protection mode (the determination in step S1801 is NO), the vehicle control apparatus 20 exits the return task.

Otherwise, when it is determined that the operation mode is the reprogramming protection mode (the determination in step S1801 is YES), the vehicle control apparatus 20 references a period that has elapsed since the shift of the operation mode to the reprogramming protection mode. Then, the vehicle control apparatus 20 determines whether the referenced period exceeds a predetermined maintenance period for the reprogramming protection mode in step S1802.

When it is determined that the referenced period does not exceed the predetermined maintenance period for the reprogramming protection mode (the determination in step S1802 is NO), the vehicle control apparatus 20 exits the return task.

Otherwise, when it is determined that the referenced period exceeds the predetermined maintenance period for the reprogramming protection mode (the determination in step S1802 is YES), the vehicle control apparatus 20 returns from the reprogramming protection mode to the reprogramming initial mode in step S1803.

In this case, it is preferable that, as the maintenance period, a long enough period, such as one week, allowed to recover the data reprogramming system 100 be set.

Figure 19:
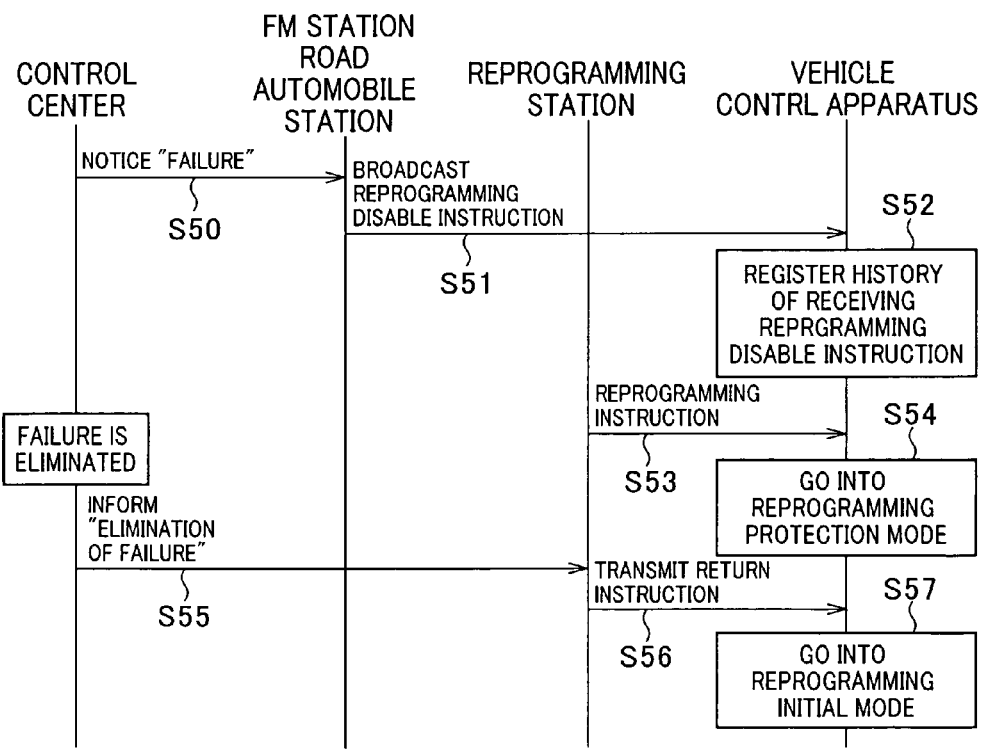
FIG. 19 is a sequence diagram schematically illustrating a return task to be executed by the data reprogramming system using the second condition according to another modification of each of the first to third embodiments of the present invention.

FIG. 19 schematically illustrates a return task to be executed by the data reprogramming system 100A using the second condition.

As well as the third embodiment, when a failure occurring in the data reprogramming system 100A so that a reprogramming instruction to be transmitted to each of the motor vehicles 13 is likely to be invalid, the control center 10A informs the FM broadcast station 30 and the road automobile communication station 31 of "failure" in step S50.

When receiving the notice "failure", the FM broadcast station 30 and the road automobile communication system 31 broadcast the reprogramming disable instruction to the vehicle control apparatus 20A of each of the motor vehicles 13A via the FM multiplex broadcast network 30A and the infrared or radio communication network 31A in step S51.

When receiving the reprogramming disable instruction, the vehicle control apparatus 20A of each of the motor vehicles 13A registers in at least one rewritable memory 28 a history of receiving the reprogramming disable instruction in step S52.

In a state that the history of receiving the reprogramming disable instruction has been stored in the at least one rewritable memory 28, when receiving a reprogramming instruction transmitted from a reprogramming station 11 in step S53, the vehicle control apparatus 20A goes into the reprogramming protection mode in step S54.

Thereafter, when the failure is eliminated in the data reprogramming system 100A, the control center 10A informs each of the reprogramming stations 11 of "elimination of failure" in step S55.

When receiving the "elimination of failure", each of the reprogramming stations 11 transmits, to a corresponding at least one of the motor vehicles 13A, a return instruction from the reprogramming protection mode via the cellular phone lines 12 in step S56. Specifically, because the failure is eliminated in the data reprogramming system 100A, it is possible to use the cellular phone lines 12 in order to transmit the return instruction.

When receiving the return instruction, the vehicle control apparatus 20A of each of the motor vehicles 13A goes into the reprogramming initial mode in step S57. The control center 10A can transmit the return instruction to each of the motor vehicles 13A via the FM multiplex broadcast network 30A and the infrared or radio communication network 31A except for the cellular phone lines 12.

Figure 20:
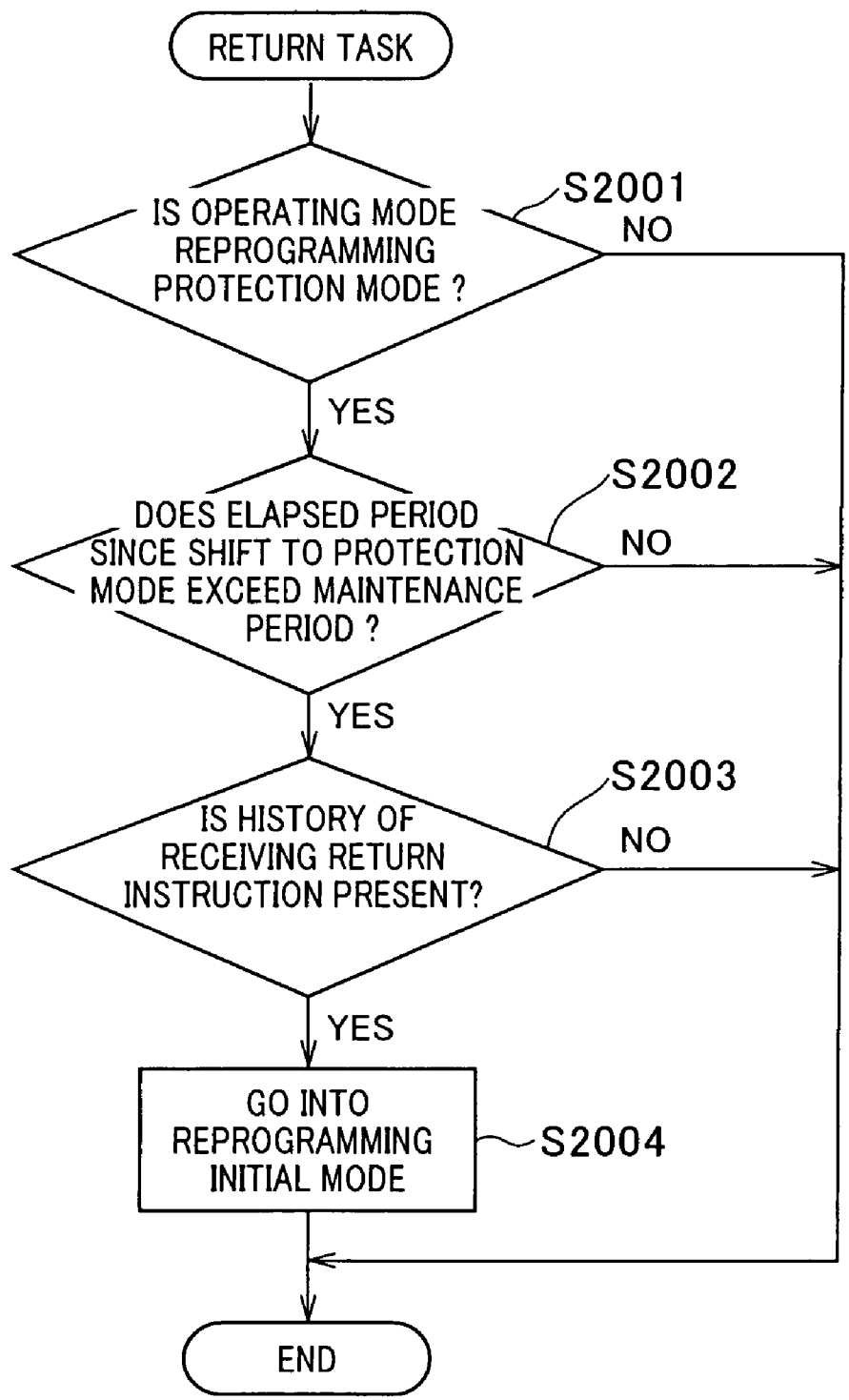
FIG. 20 is a flowchart schematically illustrating a return task to be executed by the vehicle control apparatus of each of the motor vehicles using the first and second conditions according to a further modification of each of the first to third embodiments of the present invention.

FIG. 20 schematically illustrates a return task to be executed by the vehicle control apparatus 20 of each of the motor vehicles 13 using the first and second conditions. The return task is executed by the vehicle control apparatus 20 each time an interrupt periodically occurs.

When starting the return task, the vehicle control apparatus 20 determines whether its operation mode is the reprogramming protection mode in step S2001. When it is determined that the operation mode is not the reprogramming protection mode (the determination in step S2001 is NO), the vehicle control apparatus 20 exits the return task.

Otherwise, when it is determined that the operation mode is the reprogramming protection mode (the determination in step S2001 is YES), the vehicle control apparatus 20 references a period that has elapsed since the shift of the operation mode to the reprogramming protection mode. Then, the vehicle control apparatus 20 determines whether the referenced period exceeds a predetermined maintenance period for the reprogramming protection mode in step S2002.

When it is determined that the referenced period does not exceed the predetermined maintenance period for the reprogramming protection mode (the determination in step S2002 is NO), the vehicle control apparatus 20 exits the return task.

Otherwise, when it is determined that the referenced period exceeds the predetermined maintenance period for the reprogramming protection mode (the determination in step S2002 is YES), the vehicle control apparatus 20 determines whether a history of receiving the return instruction is registered therein.

When it is determined that no history of receiving the return instruction is registered therein (the determination in step S2003 is NO), the vehicle control apparatus 20 exits the return task.

Otherwise, when it is determined that the history of receiving the return instruction is registered therein (the determination in step S2003 is YES), the vehicle control apparatus 20A returns from the reprogramming protection mode to the reprogramming initial mode in step S2004.

Such release of the disabling of receipt or execution of the reprogramming instructions can be manually performed by the owner of a corresponding one of the motor vehicles 13A. Specifically, when the failure is eliminated in the data reprogramming system 100A, an administrator for the data reprogramming system 100A contacts the owner of each of the motor vehicles 13A with a request to cancel the disabling of receipt or execution of the reprogramming instructions. Thus, the owner of each of the motor vehicles 13 manipulates the data reprogramming system 100A to cancel the disabling of receipt or execution of the reprogramming instructions.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A vehicle control apparatus installed in a vehicle for reprogramming data stored therein based on a reprogramming instruction transmitted thereto via a wireless communication network, the vehicle control apparatus comprising:
   an asking unit configured to ask a data reprogramming unit about whether the reprogramming instruction is validated or not, the data reprogramming unit having been authorized to reprogram the data stored in the vehicle control-apparatus, the data programming unit being external to the vehicle control system; and
   a determining unit configured to receive a reply to the asking transmitted from the data reprogramming unit via the wireless communication network and to determine whether to enable or disable the reprogramming of the data stored in the vehicle control apparatus based on the received reply.

2. A vehicle control apparatus according to claim 1, wherein the determining unit is configured to enable the reprogramming of the data stored in the vehicle control apparatus when the reply represents that the reprogramming instruction is validated.

3. A vehicle control apparatus according to claim 1, wherein the determining unit is configured to disable the reprogramming of the data stored in the vehicle control apparatus when the reply represents that the reprogramming instruction is not validated.

4. A vehicle control apparatus according to claim 1, further comprising: a receipt disabling unit configured to, when the reply represents that the reprogramming instruction is not validated, disable receipt of an alternative reprogramming instruction after the receipt of the reply.

5. A vehicle control apparatus according to claim 1, wherein the data reprogramming unit comprises a control center and an authorized reprogramming station, the authorized reprogramming station working to transmit the reprogramming instruction under control of the control center, and the asking unit is configured to ask the authorized reprogramming station about whether the reprogramming instruction is validated or not.

6. A vehicle control apparatus according to claim 1, wherein the data reprogramming unit comprises a control center and an authorized reprogramming station, the authorized reprogramming station working to transmit the reprogramming instruction under control of the control center, and the asking unit is configured to ask the control center about whether the reprogramming instruction is validated or not.

7. A vehicle control apparatus according to claim 1, further comprising: a receiving unit configured to establish a connection through the wireless communication network between the vehicle control apparatus and a sender of the reprogramming instruction and to receive the reprogramming instruction, wherein the asking unit is configured to interrupt the established connection and to reestablish a connection through the wireless communication network between the vehicle control apparatus and the data reprogramming unit to thereby ask the data reprogramming unit about whether the reprogramming instruction is validated or not.

8. A vehicle control apparatus according to claim 1, wherein the reply transmitted from the data reprogramming unit is generated thereby based on whether a history of transmission of the reprogramming instruction has been registered in the data reprogramming unit.

9. A vehicle control apparatus according to claim 1, further comprising: a reprogramming disabling unit configured to disable the reprogramming of the data stored in the vehicle control apparatus when receiving a reprogramming disable instruction transmitted via an alternative wireless communication network except for the wireless communication network.

10. A vehicle control apparatus for reprogramming data stored therein based on a reprogramming instruction transmitted thereto via a first wireless communication network which may at times be unreliable, the vehicle control apparatus comprising:
    a receiving unit configured to receive a reprogramming disable instruction transmitted via an alternative second wireless communication network different from the first wireless communication network, thereby increasing a probability that said disable instruction is received even if the first wireless communication network is then in an unreliable status; and
    a disabling unit configured to disable, according to the reprogramming disabling instruction, any one of:
        (a) reprogramming of the data stored in the vehicle control apparatus; and
        (b) receipt of an alternative reprogramming instruction transmitted via the first wireless communication network;
    use of said alternative second wireless communication network thereby increasing reliability of data reprogramming systems based on the first wireless communication network by suppressing invalid reprogramming even if reliability of the first wireless communication network is not guaranteed or there is a failure in the first wireless communication network.

11. A vehicle control apparatus according to claim 10, wherein the first wireless communication network is a cellular network, and the reprogramming disable instruction is transmitted via, as the alternative second wireless communication network, any one of:
    an FM multiplex broadcast network;
    an infrared communication network using optical beacons; and
    a radio communication network using radio beacons.

12. A vehicle control apparatus according to claim 10, further comprising:
    a canceling unit configured to cancel the disabling of the receipt of the alternative reprogramming instruction when at least one of first and second conditions is met,
    the first condition being that a predetermined period has elapsed,
    the second condition being that a return instruction is received via any one of the first wireless communication network and the alternative second wireless communication network.

13. A vehicle control apparatus according to claim 10, further comprising:
    a canceling unit configured to cancel the disabling of the receipt of the alternative reprogramming instruction in response to a return instruction being input by a driver of a vehicle in which the vehicle control system is installed beforehand.

14. A data reprogramming system for reprogramming data stored in a vehicle control apparatus installed in a vehicle based on a reprogramming instruction transmitted thereto via a wireless communication network, the data reprogramming system comprising:
    a data reprogramming unit that has been authorized to reprogram the data stored in the vehicle control apparatus, the data reprogramming unit being external to the vehicle control apparatus;
    an asking unit installed in the vehicle control apparatus and configured to ask the data reprogramming unit about whether the reprogramming instruction is validated or not; and
    a determining unit installed in the vehicle control apparatus and configured to receive a reply to the asking transmitted from the data reprogramming unit via the wireless communication network and to determine whether to enable or disable the reprogramming of the data stored in the vehicle control apparatus based on the received reply.

15. A data reprogramming system according to claim 14, wherein the determining unit is configured to enable the reprogramming of the data stored in the vehicle control apparatus when the reply represents that the reprogramming instruction is validated.

16. A data reprogramming system according to claim 14, wherein the determining unit is configured to disable the reprogramming of the data stored in the vehicle control apparatus when the reply represents that the reprogramming instruction is not validated.

17. A data reprogramming system according to claim 14, further comprising: a receipt disabling unit installed in the vehicle control apparatus and configured to, when the reply represents that the reprogramming instruction is not validated, disable receipt of an alternative reprogramming instruction after the receipt of the reply.

18. A data reprogramming system according to claim 14, wherein the data reprogramming unit comprises a control center and an authorized reprogramming station, the authorized reprogramming station working to transmit the reprogramming instruction under control of the control center, and the asking unit is configured to ask the authorized reprogramming station about whether the reprogramming instruction is validated or not.

19. A data reprogramming system according to claim 14, wherein the data reprogramming unit comprises a control center and an authorized reprogramming station, the authorized reprogramming station working to transmit the reprogramming instruction under control of the control center, and the asking unit is configured to ask the control center about whether the reprogramming instruction is validated or not.

20. A data reprogramming system according to claim 14, further comprising: a receiving unit installed in the vehicle control apparatus and configured to establish a connection through the wireless communication network between the vehicle control apparatus and a sender of the reprogramming instruction and to receive the reprogramming instruction, wherein the asking unit is configured to interrupt the established connection and to reestablish a connection through the wireless communication network between the vehicle control apparatus and the data reprogramming unit to thereby ask the data reprogramming unit about whether the reprogramming instruction is validated or not.

21. A data reprogramming system according to claim 14, wherein the data reprogramming unit is configured to generate the reply based on whether a history of transmission of the reprogramming instruction has been registered therein.

22. A data reprogramming system according to claim 14, further comprising: a reprogramming disabling unit installed in the vehicle control apparatus and configured to disable the reprogramming of the data stored in the vehicle control apparatus when receiving a reprogramming disable instruction transmitted via an alternative wireless communication network except for the wireless communication network.

23. A data reprogramming system according to claim 17, further comprising: a canceling unit configured to cancel the disabling of the receipt of the alternative reprogramming instruction when at least one of first and second conditions is met, the first condition being that a predetermined period has elapsed, the second condition being that a return instruction is received via any one of the wireless communication network and the alternative wireless communication network.

24. A data reprogramming system according to claim 17, further comprising: a canceling unit configured to cancel the disabling of the receipt of the alternative reprogramming instruction in response to a return instruction being input by a driver of a vehicle in which the vehicle control apparatus is installed beforehand.

25. A data reprogramming system for reprogramming data stored in a vehicle control apparatus based on a reprogramming instruction transmitted thereto via a first wireless communication network which may at times be unreliable, the data reprogramming system comprising:
a data reprogramming unit that has been authorized to reprogram the data stored in the vehicle control apparatus; and
a receiving unit installed in the vehicle control apparatus and configured to receive a reprogramming disable instruction transmitted from the data reprogramming unit via an alternative wireless communication network different than the first wireless communication network, thereby increasing a probability that said disable instruction is received even if the first wireless communication network is then in an unreliable status;
the reprogramming disable instruction representing disabling of any one of:
reprogramming of the data stored in the vehicle control apparatus; and
receipt of an alternative reprogramming instruction transmitted via the wireless communication network;
use of said alternative second wireless communication network thereby increasing reliability of data reprogramming systems based on the first wireless communication network by suppressing invalid reprogramming even if reliability of the first wireless communication network is not guaranteed or there is a failure in the first wireless communication network.

26. A data reprogramming system according to claim 25, wherein the reprogramming disable instruction is transmitted via, as the alternative wireless communication network, any one of: an FM multiplex broadcast network; an infrared communication network using optical beacons; and a radio communication network using radio beacons.

27. A data reprogramming system according to claim 25, further comprising a disabling unit configured to disable, according to the reprogramming disabling instruction, any one of: reprogramming of the data stored in the vehicle control apparatus; and receipt of an alternative reprogramming instruction transmitted via the wireless communication network.

28. A data reprogramming system according to claim 25, further comprising: a canceling unit configured to cancel the disabling of the receipt of the alternative reprogramming instruction when at least one of first and second conditions is met, the first condition being that a predetermined period has elapsed, the second condition being that a return instruction is received via any one of the wireless communication network and the alternative wireless communication network.

29. A data reprogramming system according to claim 25, further comprising: a canceling unit configured to cancel the disabling of the receipt of the alternative reprogramming instruction in response to a return instruction being input by a driver of a vehicle in which the vehicle control apparatus is installed beforehand.

* * * * *